(12) United States Patent
Mihara

(10) Patent No.: US 12,090,838 B2
(45) Date of Patent: Sep. 17, 2024

(54) VALVE DEVICE FOR FUEL TANK

(71) Applicant: PIOLAX, INC., Kanagawa (JP)

(72) Inventor: Kenta Mihara, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 15 days.

(21) Appl. No.: 18/034,604

(22) PCT Filed: Nov. 9, 2021

(86) PCT No.: PCT/JP2021/041091
§ 371 (c)(1),
(2) Date: Apr. 28, 2023

(87) PCT Pub. No.: WO2022/102594
PCT Pub. Date: May 19, 2022

(65) Prior Publication Data
US 2024/0001759 A1    Jan. 4, 2024

(30) Foreign Application Priority Data

Nov. 10, 2020 (JP) .................................. 2020-187545

(51) Int. Cl.
*B60K 15/035* (2006.01)
*B60K 15/03* (2006.01)
*F16K 24/04* (2006.01)

(52) U.S. Cl.
CPC .......... *B60K 15/035* (2013.01); *F16K 24/042* (2013.01); *B60K 2015/03289* (2013.01)

(58) Field of Classification Search
CPC .................... F16K 24/042; B60K 2015/03289
See application file for complete search history.

(56) References Cited

U.S. PATENT DOCUMENTS 6,959,720 B2 * 11/2005 Kurihara .......... B60K 15/03519
137/202
7,163,023 B2 * 1/2007 Spink .................... F16K 24/044
137/430
(Continued)

FOREIGN PATENT DOCUMENTS

JP    2005-133875 A    5/2005
JP    2005-299577 A    10/2005
(Continued)

OTHER PUBLICATIONS

Jan. 11, 2022, International Search Report issued for related PCT Application No. PCT/JP2021/041091.
(Continued)

*Primary Examiner* — Eric Keasel
(74) *Attorney, Agent, or Firm* — Paratus Law Group, PLLC

(57) ABSTRACT

There is provided a valve device for a fuel tank including: a housing; a first float valve accommodated in a first valve chamber; and a second float valve accommodated in a second valve chamber. The housing includes a housing body and a lower cap. The housing body has a housing body peripheral wall. The housing body peripheral wall has a first valve chamber forming wall that forms an outer periphery of the first valve chamber, and a second valve chamber forming wall that has a contour shape different from that of the first valve chamber forming wall and that forms an outer periphery of the second valve chamber. The lower cap has a cap peripheral wall having a shape fitting to the housing body peripheral wall.

9 Claims, 16 Drawing Sheets

(56) References Cited

U.S. PATENT DOCUMENTS

| | | | | |
|---|---|---|---|---|
| 7,243,639 B2 * | 7/2007 | Ueki | ............... | F16K 24/044 |
| | | | | 123/518 |
| 9,981,546 B2 * | 5/2018 | Mihara | ............... | B60K 15/035 |
| 10,267,275 B2 * | 4/2019 | Mihara | ............... | F02M 37/20 |
| 10,913,650 B2 * | 2/2021 | He | ............... | B67D 7/365 |
| 10,946,737 B2 * | 3/2021 | Iino | ............... | B60K 15/03519 |
| 10,967,734 B2 * | 4/2021 | Sui | ............... | F02M 37/0023 |
| 11,001,138 B2 * | 5/2021 | Kim | ............... | F16K 24/044 |
| 2005/0092364 A1 | 5/2005 | Furuya et al. | | |
| 2005/0229967 A1 | 10/2005 | Ueki | | |
| 2020/0031221 A1 | 1/2020 | Sui et al. | | |

FOREIGN PATENT DOCUMENTS

| | | | |
|---|---|---|---|
| JP | 2006-177164 A | 7/2006 |
| JP | 2006-183596 A | 7/2006 |
| JP | 2020-016209 A | 1/2020 |
| JP | 2020-165318 A | 10/2020 |

OTHER PUBLICATIONS

Jan. 11, 2022, International Search Opinion issued for related PCT Application No. PCT/JP2021/041091.
Aug. 4, 2022, International Preliminary Report on Patentability issued for related PCT Application No. PCT/JP2021/041091.

* cited by examiner

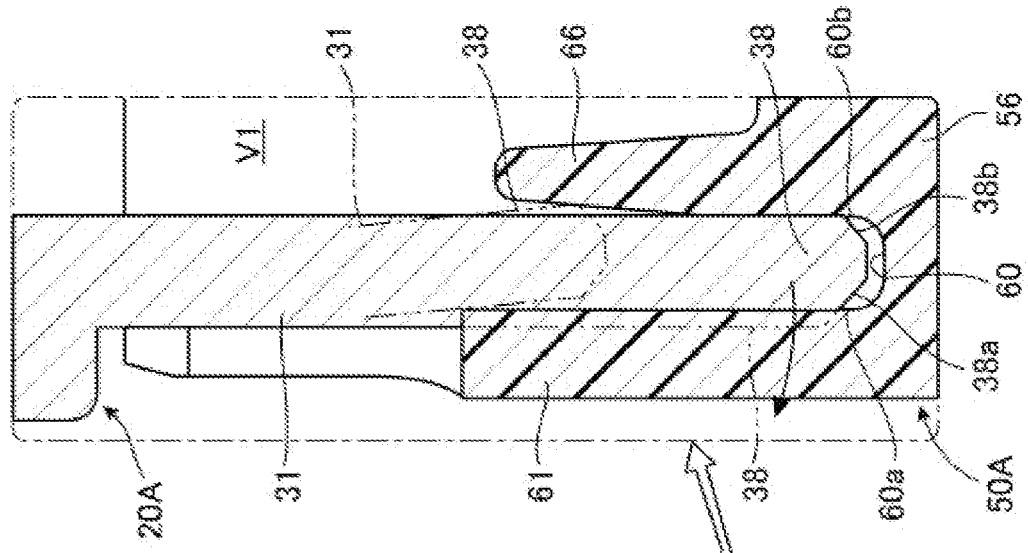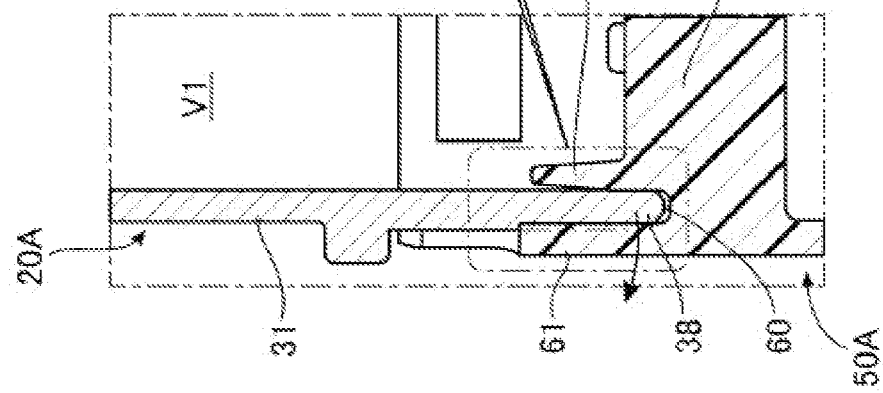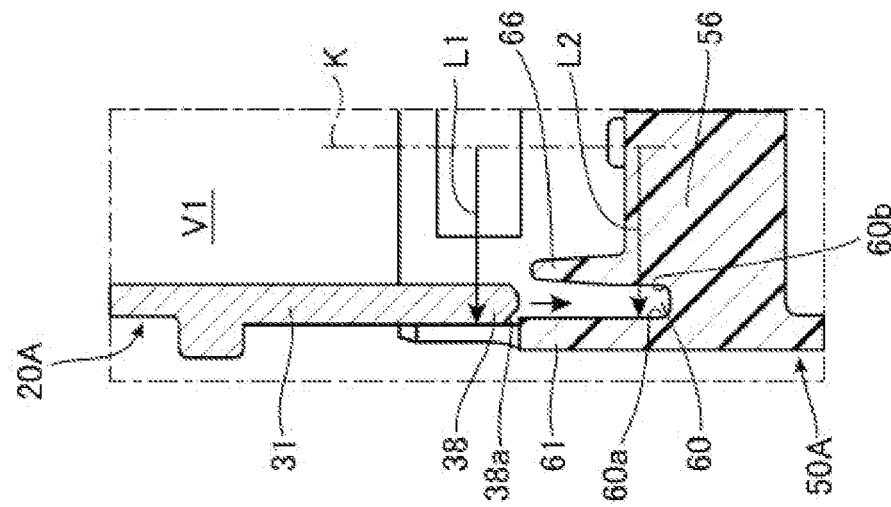
FIG. 15A
FIG. 15B

VALVE DEVICE FOR FUEL TANK

CROSS REFERENCE TO PRIOR APPLICATION

This application is a National Stage Patent Application of PCT International Patent Application No. PCT/JP2021/041091 (filed on Nov. 9, 2021) under 35 U.S.C. § 371, which claims priority to Japanese Patent Application No. 2020-187545 (filed on Nov. 10, 2020), which are all hereby incorporated by reference in their entirety.

TECHNICAL FIELD

The present invention relates to a valve device for a fuel tank, which is attached to a fuel tank of an automobile or the like and includes a full tank regulation valve and a fuel-effusion suppression valve.

BACKGROUND ART

For example, a fuel tank of an automobile is provided with a full tank regulation valve for suppressing excessive refueling into the fuel tank so that a liquid surface in the fuel tank does not rise above a preset full-tank liquid surface, a fuel-effusion suppression valve for suppressing fuel in the fuel tank from leaking out of the fuel tank when the automobile turns or tilts, and the like.

As a valve device including two valves as described above, Patent Literature 1 below describes a valve for a fuel tank including an upper space communicating with a canister, a lower chamber disposed in the fuel tank, a communicating portion for allowing the upper chamber to communicate with the lower chamber, and a float body for blocking the communicating portion. The lower chamber includes an upper case having a peripheral wall with a substantially circular cross section, and a lower case attached to a lower opening of the upper case and having a peripheral wall with a substantially circular cross section adapted to the peripheral wall of the upper case. Further, a partition plate is disposed in each of the upper case and the lower case, and the lower chamber is partitioned into a first chamber and a second chamber. The lower case is assembled to the lower opening of the upper case after the partition plate of the lower case is aligned with the partition plate of the upper case. A first float is disposed in the first chamber, and a second float is disposed in the second chamber.

CITATION LIST

Patent Literature

Patent Literature 1: JP2005-299577A

SUMMARY OF INVENTION

Technical Problem

In the valve for a fuel tank of Patent Literature 1, it is originally necessary to align the partition plate of the upper case and the partition plate of the lower case. However, since the peripheral walls of the upper case and the lower case have a substantially circular cross section, the lower case may be assembled to the lower opening of the upper case in a wrong orientation (erroneous assembly) even if the partition plates of both cases are not aligned with each other.

Therefore, an object of the present invention is to provide a valve device for a fuel tank that can reliably suppress a lower cap from being erroneously assembled below a housing body.

Solution to Problem

In order to achieve the above object, a valve device for a fuel tank according to the present invention includes:
a housing provided with a first valve chamber and a second valve chamber which are configured to communicate with an inside of the fuel tank below a partition wall and a ventilation chamber configured to communicate with an outside of the fuel tank above the partition wall, in which the partition wall is provided with a first opening through which the first valve chamber is to communicate with the ventilation chamber and a second opening through which the second valve chamber is to communicate with the ventilation chamber;
a first float valve accommodated in the first valve chamber in a vertically movable manner and configured to block the first opening when a liquid surface in the fuel tank reaches near a set full-tank liquid surface; and
a second float valve accommodated in the second valve chamber in a vertically movable manner and configured to block the second opening when the liquid surface in the fuel tank rises to a predetermined height or more, in which
the housing includes a housing body and a lower cap mounted below the housing body,
the housing body has a housing body peripheral wall that is open at a bottom,
the housing body peripheral wall has a first valve chamber forming wall that forms an outer periphery of the first valve chamber, and a second valve chamber forming wall that has a contour shape different from that of the first valve chamber forming wall as viewed in a valve axis direction and that forms an outer periphery of the second valve chamber, and
the lower cap has a cap peripheral wall having a shape fitting to the housing body peripheral wall.

Advantageous Effects of Invention

According to the present invention, the housing body peripheral wall has the first valve chamber forming wall, and the second valve chamber forming wall that has a contour shape different from that of the first valve chamber forming wall and that forms an outer periphery of the second valve chamber as viewed in a valve axis direction, and the lower cap has the cap peripheral wall having a shape fitting to the housing body peripheral wall. Therefore, when the lower cap is mounted below the housing body, the lower cap is mounted in a state in which corresponding portions of the cap peripheral wall are aligned with the first valve chamber forming wall and the second valve chamber forming wall of the housing body peripheral wall, respectively, and thus it is possible to reliably suppress the lower cap from being erroneously assembled below the housing body.

BRIEF DESCRIPTION OF DRAWINGS

[FIGS. 15A and 15B] FIGS. 15A and 15B show a process of assembling the lower cap below the housing body, FIG. 15A is a partially enlarged explanatory view showing a state before a lower end of a first valve chamber forming wall of the housing body is inserted into a groove of the lower cap, and FIG. 15B is a partially enlarged explanatory view showing a state in which the lower end of the first valve chamber forming wall of the housing body is inserted into the groove of the lower cap.

DESCRIPTION OF EMBODIMENTS (Embodiment of Valve Device for Fuel Tank)

Hereinafter, an embodiment of a valve device for a fuel tank according to the present invention will be described with reference to FIGS. 1 to 9.

Figure 1:
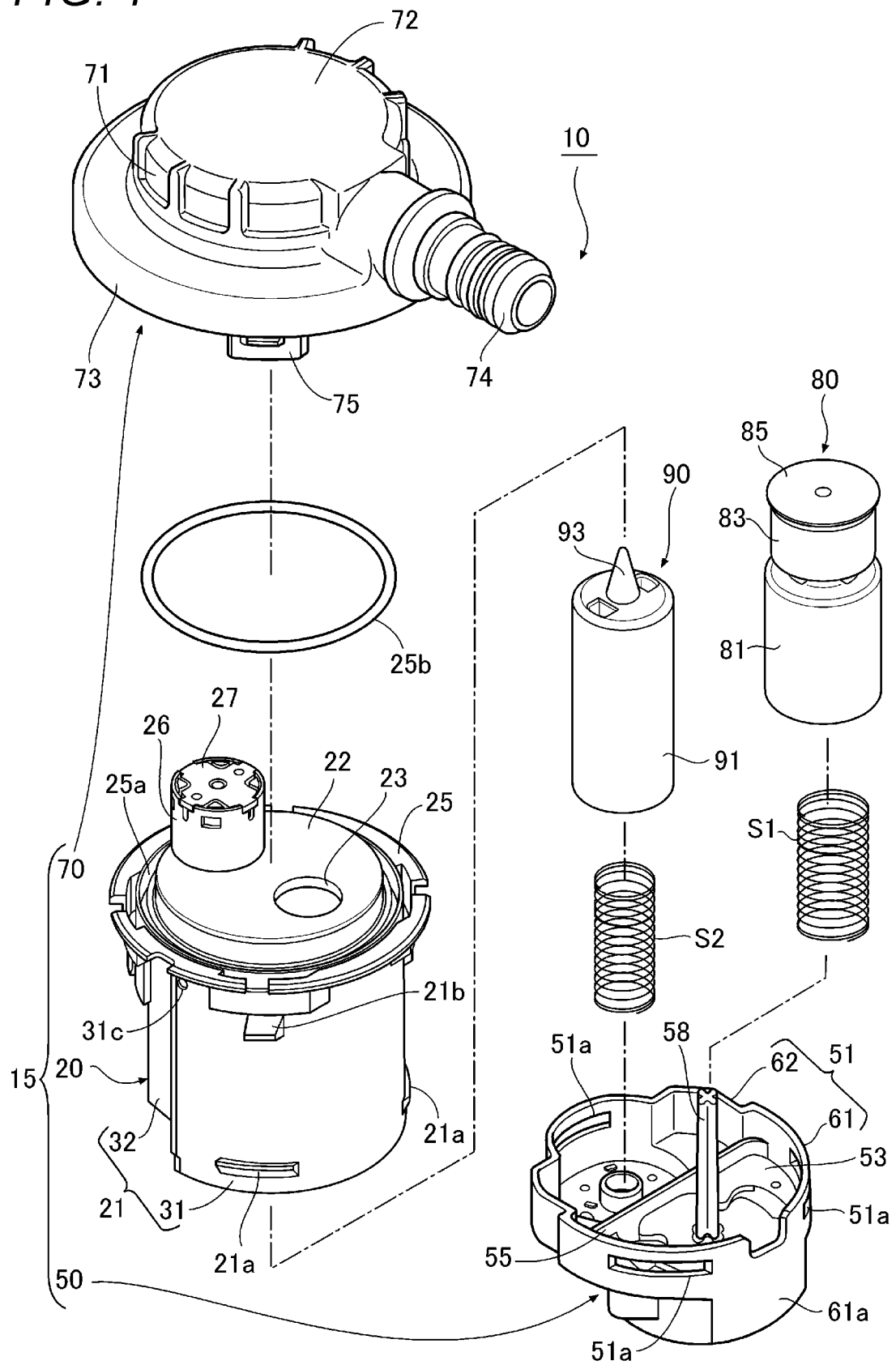
FIG. 1 is an exploded perspective view showing an embodiment of a valve device for a fuel tank according to the present invention.
Figure 2:
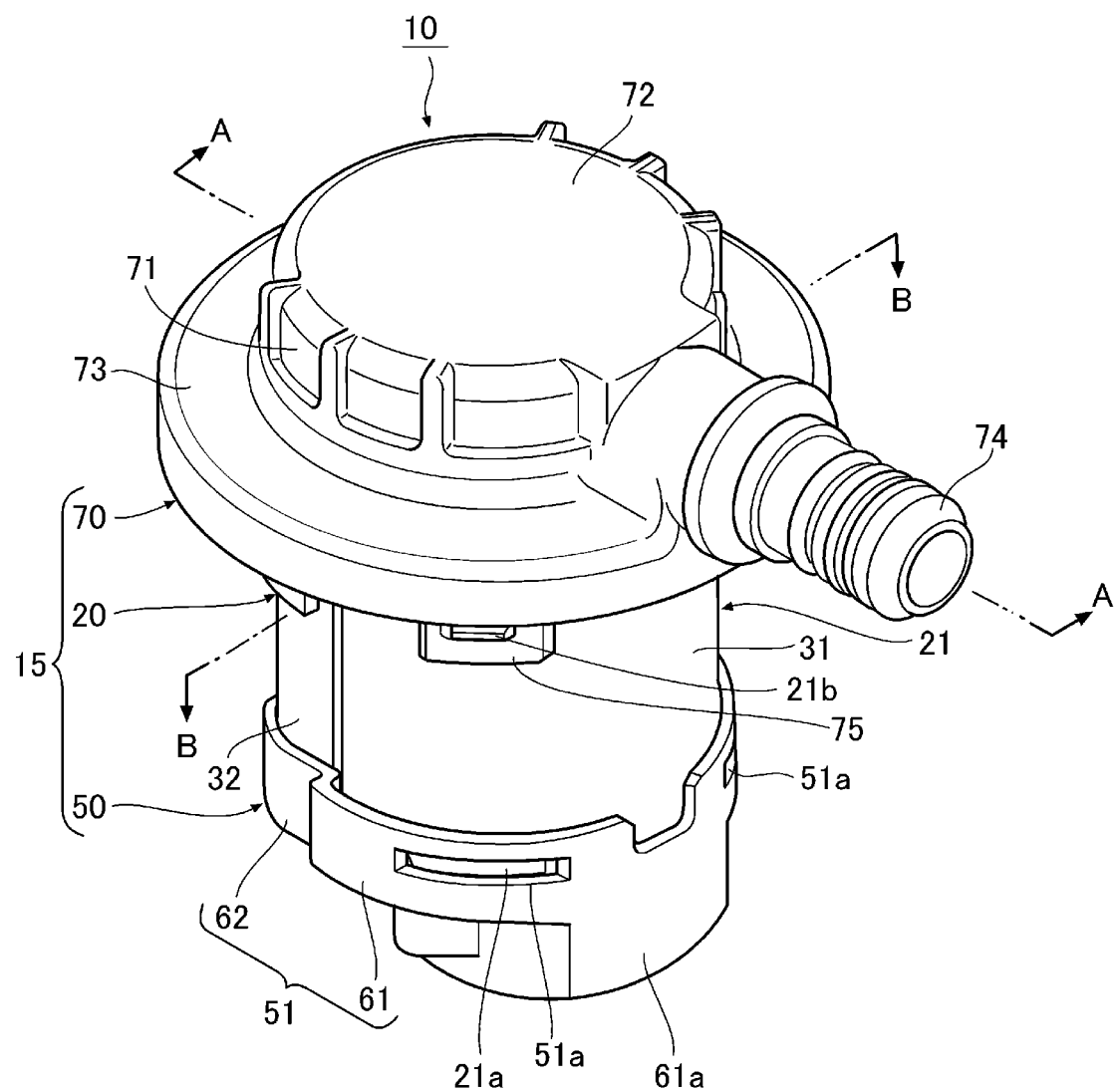
FIG. 2 is a perspective view of the valve device for a fuel tank.

As shown in FIGS. 1 and 2, a valve device 10 for a fuel tank (hereinafter, also simply referred to as a "valve device 10") according to the embodiment mainly includes: a housing 15 provided with a first valve chamber V1 and a second valve chamber V2 communicating with an inside of the fuel tank below a partition wall 22 and a ventilation chamber R communicating with an outside of the fuel tank above the partition wall 22, the partition wall 22 being formed with a first opening 23 and a second opening 24; a first float valve 80 accommodated in the first valve chamber V1 in a vertically movable manner and configured to block the first opening 23 when a liquid surface in the fuel tank reaches near a set full-tank liquid surface; a second float valve 90 accommodated in the second valve chamber V2 in a vertically movable manner and configured to block the second opening 24 when the liquid surface in the fuel tank rises to a predetermined height or more; a first biasing spring S1 for biasing the first float valve 80; and a second biasing spring S2 for biasing the second float valve 90.

The housing 15 of the embodiment includes a housing body 20, a lower cap 50 mounted below the housing body 20, and an upper cover 70 mounted above the housing body 20. The upper cover 70 includes a cover peripheral wall 71 having a substantially circular outer periphery as viewed in a valve axis direction (a specific structure of the upper cover 70 will be described later).

In the following description, "fuel" means liquid fuel (including fuel droplets), and "fuel vapor" means evaporated fuel.

First, the housing body 20 will be described with reference to FIGS. 1 and 4 to 6.

The housing body 20 has a substantially tubular shape with the partition wall 22 on the top and an opening on the bottom. The housing body 20 includes a housing body peripheral wall 21 and a division wall 30 that divides an inner space of the housing body 20 into the first valve chamber V1 and the second valve chamber V2. As shown in FIGS. 3 to 6, the division wall 30 in the embodiment has a plate-like shape passing through the axial center C1 (see FIGS. 3 and 6) of the housing 15 and extending vertically along an axial direction (which means a direction along the axial center C1 of the housing 15) of the housing 15. An upper end of the division wall 30 is connected to a back surface of the partition wall 22.

The partition wall 22 is disposed above the housing body peripheral wall 21. Further, a plurality of first locking claws 21a protrude from a lower part of the housing body peripheral wall 21, and a plurality of second locking claws 21b protrude from an upper part of the housing body peripheral wall 21.

Figure 3:
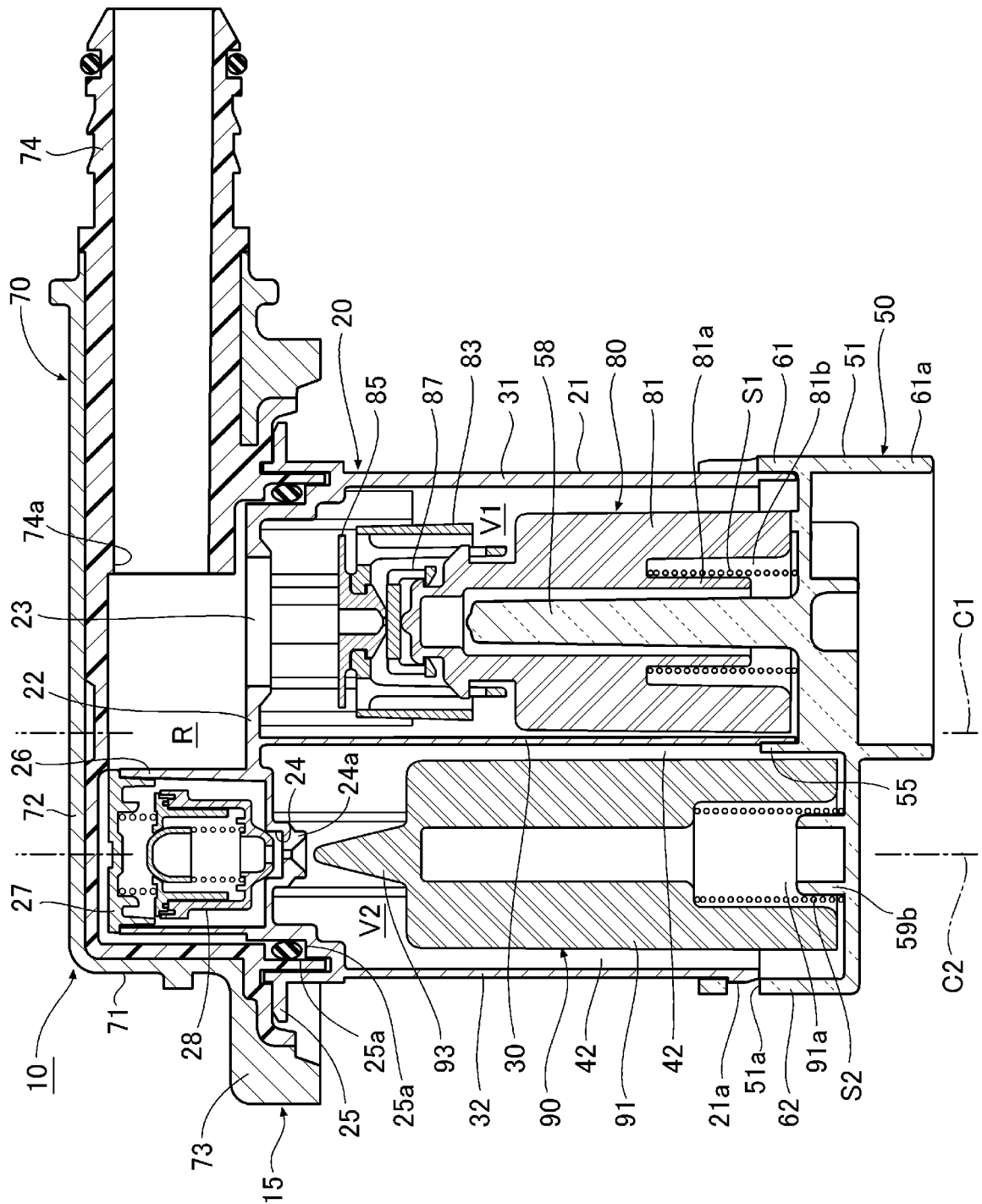
FIG. 3 is a cross-sectional view taken along a line A-A of FIG. 2.

The first opening 23 having a circular shape is formed in the partition wall 22, and the first valve chamber V1 and the ventilation chamber R communicate with each other via the first opening 23. As shown in FIG. 3, a second opening 24 having a smaller diameter than the first opening 23 is formed in the partition wall 22, and the second valve chamber V2 and the ventilation chamber R communicate with each other via the second opening 24. A valve seat 24a having an annular protruding shape and a tapered inner surface protrudes from a rear periphery of the second opening 24.

Further, a flange portion 25 projects from an upper outer periphery of the housing body peripheral wall 21. A ring mounting groove 25a is formed inside the flange portion 25, and an annular seal ring 25b is mounted in the ring mounting groove 25a.

On a front surface of the partition wall 22, a tubular portion 26 having an upper opening protrudes from a periphery of the second opening 24. A cap 27 is mounted on the upper opening of the tubular portion 26. As shown in FIG. 3, a pressure adjustment valve 28 is accommodated in a vertically movable manner inside the tubular portion and the cap, and can adjust pressure in the fuel tank.

Figure 6:
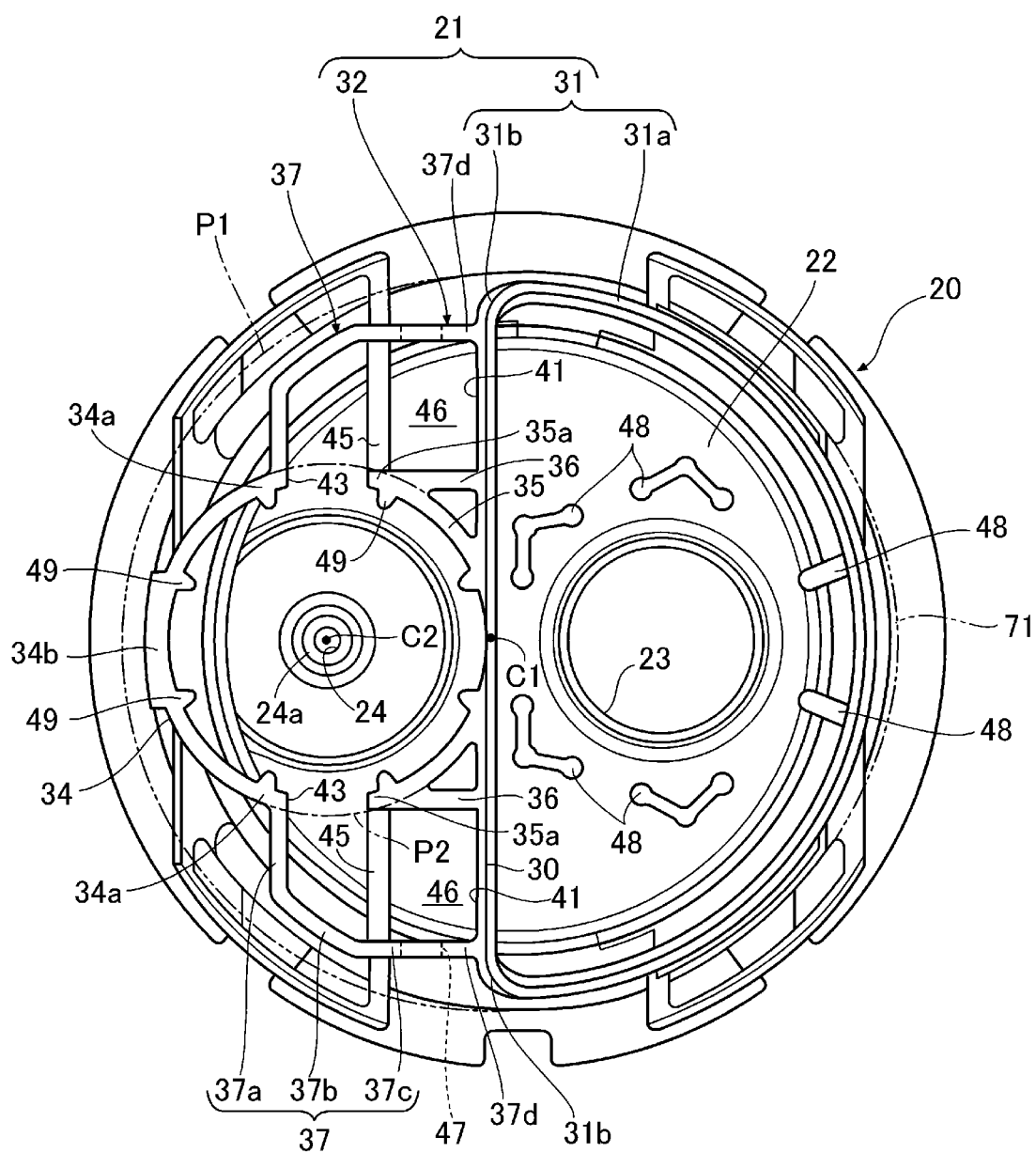
FIG. 6 is a bottom view of the housing body of the valve device for a fuel tank.

As shown in FIG. 6, the housing body peripheral wall 21 includes a first valve chamber forming wall 31 that forms an outer periphery of the first valve chamber V1, and a second valve chamber forming wall 32 that has a contour shape different from that of the first valve chamber forming wall 31 and that forms an outer periphery of the second valve chamber V2 as viewed in the valve axis direction. The first valve chamber forming wall 31 and the second valve chamber forming wall 32 extend in the same shape from lower ends to upper ends thereof, and the upper ends are connected to the partition wall 22. The "valve axis direction" in the present invention means an axial direction (a direction along axial centers of the float valves 80 and 90) of the float valves 80 and 90 (the same applies to the following description).

In FIG. 6, the cover peripheral wall 71 of the upper cover 70 having a circular shape as viewed in the valve axis direction is indicated by a two-dot chain line. As shown in FIG. 6, when the housing body 20 is viewed in the valve axis direction, in other words, when the housing body 20 is viewed in the axial direction of the housing 15 (which means the direction along the axial center C1 of the housing 15), the first valve chamber forming wall 31 has a concentric portion 31a provided concentrically with respect to the cover peripheral wall 71 of the upper cover 70. The concentric portion 31a has a semicircular shape. Further, at both end portions in a circumferential direction of the first valve chamber forming wall 31, which are connected to both side parts in a width direction of the division wall 30, bulging portions 31b, 31b having a bulging shape are provided with respect to connection portions 37d, 37d of the second valve chamber forming wall 32 and the division wall 30 as viewed in the valve axis direction. Each of the bulging portions 31b has a rounded curved surface shape and bulges with respect to the connection portion 37d of the second valve chamber forming wall 32. As shown in FIG. 1, a vent 31c communicating with the first valve chamber V1 is formed in an upper part of the first valve chamber forming wall 31.

Further, as shown in FIG. 6, the second valve chamber forming wall 32 has a portion located inside a circumscribed circle P1 of the first valve chamber forming wall 31 as viewed in the valve axis direction. In the embodiment, the entire second valve chamber forming wall 32 is located inside the circumscribed circle P1 of the first valve chamber forming wall 31. The circumscribed circle P1 of the first valve chamber forming wall 31 is a circle that is centered on the axis C1 of the housing 15 and that is tangent to an outer periphery of the first valve chamber forming wall 31.

The second valve chamber forming wall 32 has an outer arcuate wall 34 disposed at a position away from the division wall 30. An inner arcuate wall 35 formed along a circumscribed circle P2 of the outer arcuate wall 34 is disposed inside the second valve chamber V2. The second float valve 90 is disposed between the outer arcuate wall 34 and the inner arcuate wall 35. The circumscribed circle P2 of the outer arcuate wall 34 is a circle that is centered on an opening center C2 of the second opening 24 and that is tangent to an outer periphery of the outer arcuate wall 34.

As shown in FIG. 6, the outer arcuate wall 34 has an arcuate shape extending in the circumferential direction along the circumscribed circle P2 by a predetermined length. Similar to the outer arcuate wall 34, the inner arcuate wall 35 has an arcuate shape extending in the circumferential direction along the circumscribed circle P2 by a predetermined length. The inner arcuate wall 35 is disposed at a position facing the outer arcuate wall 34 in the circumferential direction of the circumscribed circle P2, and a central portion thereof in the circumferential direction is connected to the division wall 30. Similar to the first valve chamber forming wall 31 and the second valve chamber forming wall 32, the inner arcuate wall 35 extends in the same shape from a lower end to an upper end thereof, and the upper end is connected to the back surface of the partition wall 22.

Further, both ends 35a, 35a (ends adjacent to the outer arcuate wall 34) of the inner arcuate wall 35 in the circumferential direction are separated from both ends 34a, 34a of the outer arcuate wall 34 in the circumferential direction. Between one end 35a of the inner arcuate wall 35 and one end 34a of the outer arcuate wall 34, and between the other end 35a of the inner arcuate wall 35 and the other end 34a of the outer arcuate wall 34, gaps 43 communicating with a main flow path 41 (see FIG. 5 and the like) are formed, respectively. The gaps 43 have the same opening area.

As shown in FIG. 6, extending walls 36, 36 extend from both ends 35a, 35a of the inner arcuate wall 35 toward the division wall 30. Each of the extending walls 36 extends perpendicularly to the division wall 30, and a distal end thereof in the extending direction is connected to the division wall 30.

Further, there is provided main flow path forming walls 37 that project in an outer diameter direction of the second float valve 90 from both ends 34a, 34a of the outer arcuate wall 34 in the circumferential direction and that is connected to the division wall 30. The main flow path 41 is formed between the main flow path forming wall 37 and the inner arcuate wall 35.

Figure 5:
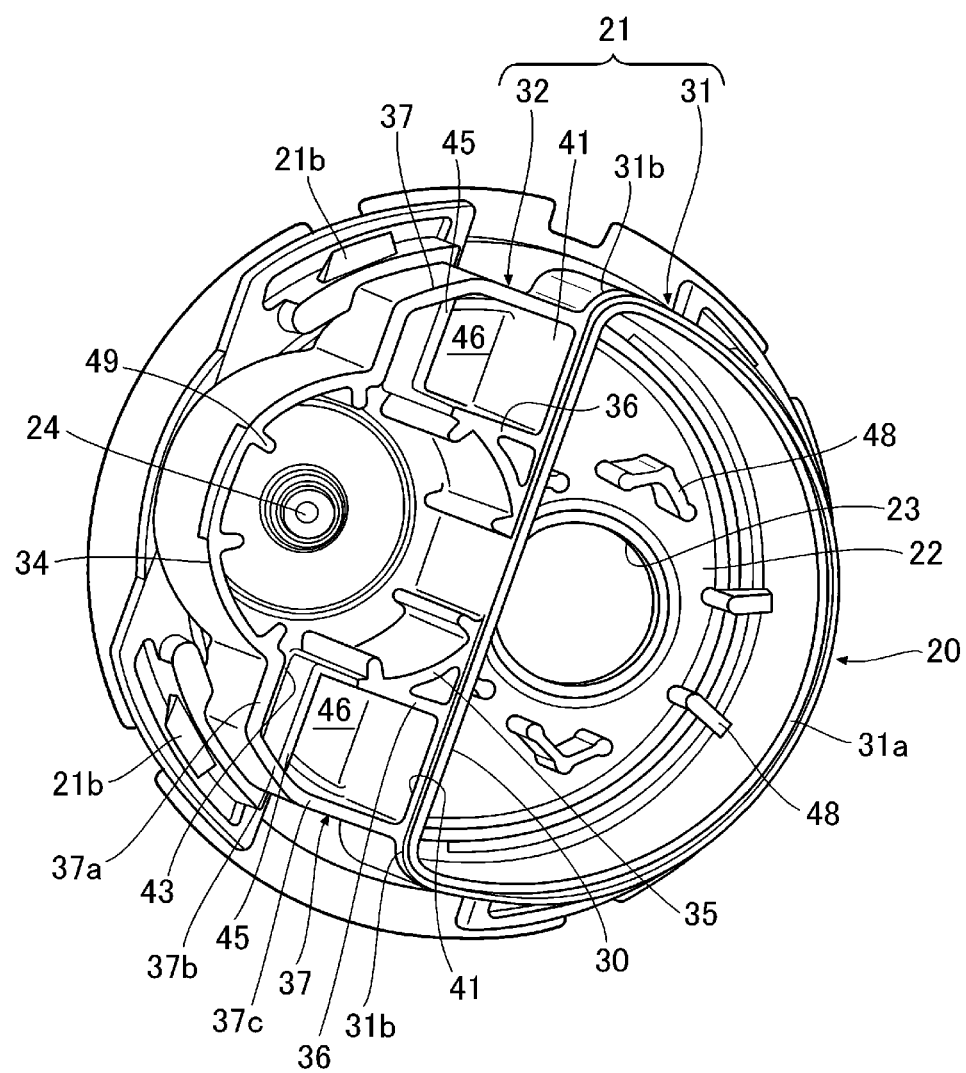
FIG. 5 is a perspective view of a housing body constituting a housing of the valve device for a fuel tank, as viewed from a direction different from that of FIG. 1.

As shown in FIGS. 5 and 6, each of the main flow path forming walls 37 in the embodiment includes a first wall portion 37a that projects outward from the end 34a of the outer arcuate wall 34 in the circumferential direction so as to be parallel to the division wall a second wall portion 37b that projects obliquely outward from a distal end of the first wall portion 37a in the extending direction in a direction away from a central portion 34b of the outer arcuate wall 34 in the circumferential direction, and a third wall portion 37c that extends perpendicularly to the division wall 30 and parallel to the extending wall 36 from a distal end of the second wall portion 37b in the extending direction. A connection portion 37d is formed at a distal end of the third wall portion 37c in the extending direction, and the main flow path forming wall 37 is connected to the division wall 30 via the connection portion 37d.

Figure 4:
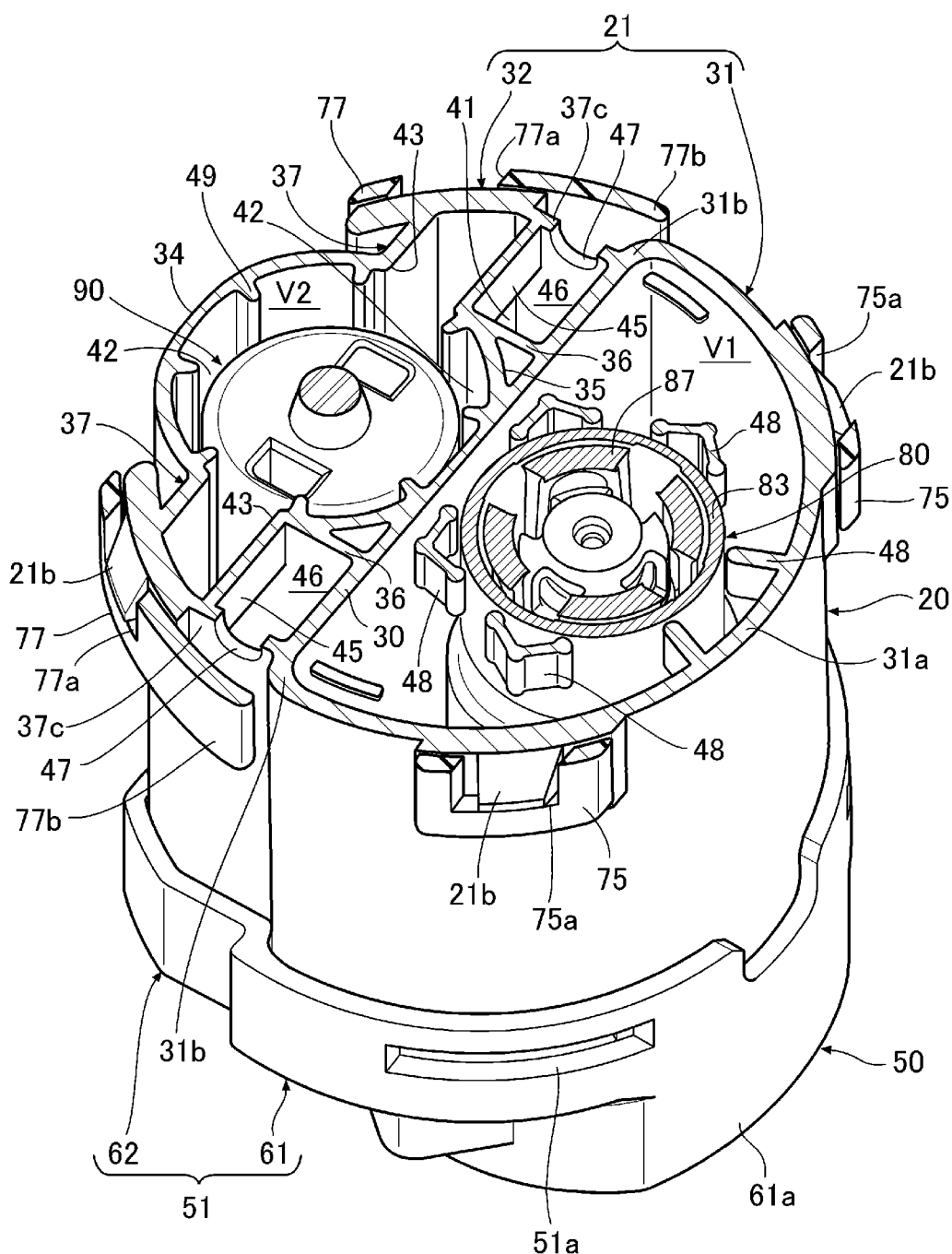
FIG. 4 is a cross-sectional view taken along a line B-B of FIG. 2.

The main flow path 41 defined by the main flow path forming wall 37 configured as described above and the inner arcuate wall 35 is provided in a range from the lower end to a position slightly below the upper end of the housing body 20 in the axial direction, and forms a flow path through which a fluid such as gas (fuel vapor or air) or liquid flows. As shown in FIG. 4, secondary flow paths 42 through which the fluid flows are formed between the outer arcuate wall 34 and the second float valve 90 and between the inner arcuate wall 35 and the second float valve 90. The main flow path 41 is formed to have a larger flow path area than the secondary flow path 42.

An upper space 46 surrounded by the main flow path forming wall 37, the division wall 30, and an extension wall 45 extending from the inner arcuate wall 35 toward the main flow path forming wall 37 is formed above the main flow path 41.

As shown in FIGS. 4 and 5, in the embodiment, the extension wall 45 extends in parallel to the division wall 30 from the end 35a of the inner arcuate wall 35 in the circumferential direction, which is an upper portion of the inner arcuate wall 35, and a distal end of the extension wall 45 in the extending direction is connected to the third wall portion 37c of the main flow path forming wall 37. The upper space 46 is surrounded by the third wall portion 37c of the main flow path forming wall 37, the division wall 30, the extension wall 45 extending from the inner arcuate wall 35 toward the main flow path forming wall 37, and the extending wall 36, and thus is formed above the main flow path 41. The partition wall 22 is disposed at an upper part of the upper space 46. Therefore, the upper space 46 is blocked at the top, is blocked at the side other than the vent 47, and is open at the bottom.

As shown in FIG. 4, the vent 47 communicating with the second valve chamber V2 is formed at a position adjacent to the bulging portion 31b of the first valve chamber forming wall 31, which is an upper part of the second valve chamber forming wall 32. The vent 47 is formed in the main flow path forming wall 37 so as to communicate with the upper space 46. More specifically, the vent 47 has a circular shape and is formed in the third wall portion 37c constituting the main flow path forming wall 37 (see FIG. 4).

As shown in FIGS. 4 to 6, a plurality of holding ribs 48 are provided on the back surface of the partition wall 22 and the first valve chamber forming wall 31 defining the first valve chamber V1. The holding ribs 48 are disposed on an outer periphery of a sealing member 83 of the first float valve 80 to suppress inclination of the first float valve 80. Further, a plurality of guide ribs 49 are provided on the second valve chamber forming wall 32 defining the second valve chamber V2 and the inner arcuate wall 35 disposed in the second valve chamber V2. The guide ribs 49 guide a vertical movement of the second float valve 90.

The shape and structure of the housing body described above are not limited to the above aspects. For example, (1) one of the first valve chamber forming wall and the second valve chamber forming wall may be formed in a semicircular shape, and the other one may be formed in a semicircular shape having a smaller diameter than the one valve chamber forming wall. (2) One of the first valve chamber forming wall and the second valve chamber forming wall may have a shape obtained by partitioning an elliptical shape, an oval shape, or a rectangular shape (a triangular shape, a quadrangular shape, or a pentagonal shape) into halves, and the other one may have the same shape but a smaller shape than the one valve chamber forming wall, or may have a completely different shape. That is, in the housing body, at least the first valve chamber forming wall and the second valve chamber forming wall may have different shapes.

Next, the lower cap 50 mounted below the housing body 20 will be described with reference to FIGS. 1, 7, 8, and the like.

The lower cap 50 has a bottomed cap shape with an opening at the top and a bottom portion 53 at the bottom. The lower cap 50 has a cap peripheral wall 51 having a shape fitting to the housing body peripheral wall 21. The cap peripheral wall 51 in the embodiment has a similar shape slightly larger than an outer peripheral shape of the housing body peripheral wall 21, and is disposed on the outer periphery of the housing body peripheral wall 21 as shown in FIG. 2.

The bottom portion 53 for supporting the first float valve 80 and the second float valve 90 is provided in a lower part of the cap peripheral wall 51. A division wall 55 that divides an internal space of the lower cap 50 into a first valve chamber V1 and a second valve chamber V2 is erected from the bottom portion 53. That is, the bottom portion 53 is divided into a first valve chamber-side bottom portion 56 and a second valve chamber-side bottom portion 57 via the division wall 55. As shown in FIG. 7, the division wall 55 is erected at a height slightly lower than an upper end of the cap peripheral wall 51, and as shown in FIG. 3, the division wall 55 overlaps with the lower end of the division wall 30 of the housing body when the lower cap is mounted below the housing body 20.

Further, a plurality of locking holes 51a are formed in an outer periphery of the cap peripheral wall 51. As shown in FIG. 2, the lower cap 50 is mounted below the housing body 20 by locking the corresponding first locking claws 21a of the housing body 20 to the respective locking holes 51a of the lower cap 50. As a result, the first valve chamber V1 and the second valve chamber V2 communicating with the fuel tank (not shown) are formed below the housing via the partition wall 22 (see FIG. 3). The first valve chamber V1 and the second valve chamber V2 are defined by the division wall 50 to form mutually independent spaces, and the two valve chambers V1 and V2 do not communicate with each other.

The first valve chamber-side bottom portion 56 is formed with a plurality of round through holes 56a and a plurality of slit-shaped through holes 56b. The through holes 56a and 56b communicate with the first valve chamber V1. Further, a support shaft 58 having a cross-shaped cross section is erected at a predetermined height from the first valve chamber-side bottom portion 56. As shown in FIG. 3, the support shaft 58 is inserted into a tubular portion 81a of the first float valve 80, and guides a vertical movement of the first float valve 80.

Further, the second valve chamber-side bottom portion 57 is provided with a bottom surface 59 that is lower than the first valve chamber-side bottom portion 56 via a concave portion 59a. A spring seat 59b having a circular protrusion shape protrudes from the bottom surface 59 and supports a lower end of the second biasing spring S2. The bottom surface 59 is formed with a plurality of round through holes 59c communicating with the second valve chamber V2.

The cap peripheral wall 51 having a shape fitting to the housing body peripheral wall 21 has a first valve chamber forming wall 61 and a second valve chamber forming wall 62. In another embodiment to be described later, the first valve chamber forming wall 61 is also referred to as a "cap-side first valve chamber forming wall 61", and the second valve chamber forming wall 62 is also referred to as a "cap-side second valve chamber forming wall 62". The first valve chamber forming wall 61 has a shape fitting to the first valve chamber forming wall 31 of the housing body peripheral wall 21, and forms the outer periphery of the first valve chamber V1 integrally with the first valve chamber forming wall 31 of the housing body peripheral wall 21. The second valve chamber forming wall 62 has an contour shape that is different from that of the first valve chamber forming wall 61 and fits to the second valve chamber forming wall 32 of the housing body peripheral wall 21, and forms the outer periphery of the second valve chamber V2 integrally with the second valve chamber forming wall 32 of the housing body peripheral wall 21. The second valve chamber forming wall 62 includes an outer arcuate wall 64, and a first wall portion 67a, a second wall portion 67b and a third wall portion 67c of a main flow path forming wall 67, which match the outer arcuate wall 34 of the housing body peripheral wall 21, and the first wall portion 37a, the second wall portion 37b and the third wall portion 37c of the main flow path forming wall 37, respectively.

Figure 7:
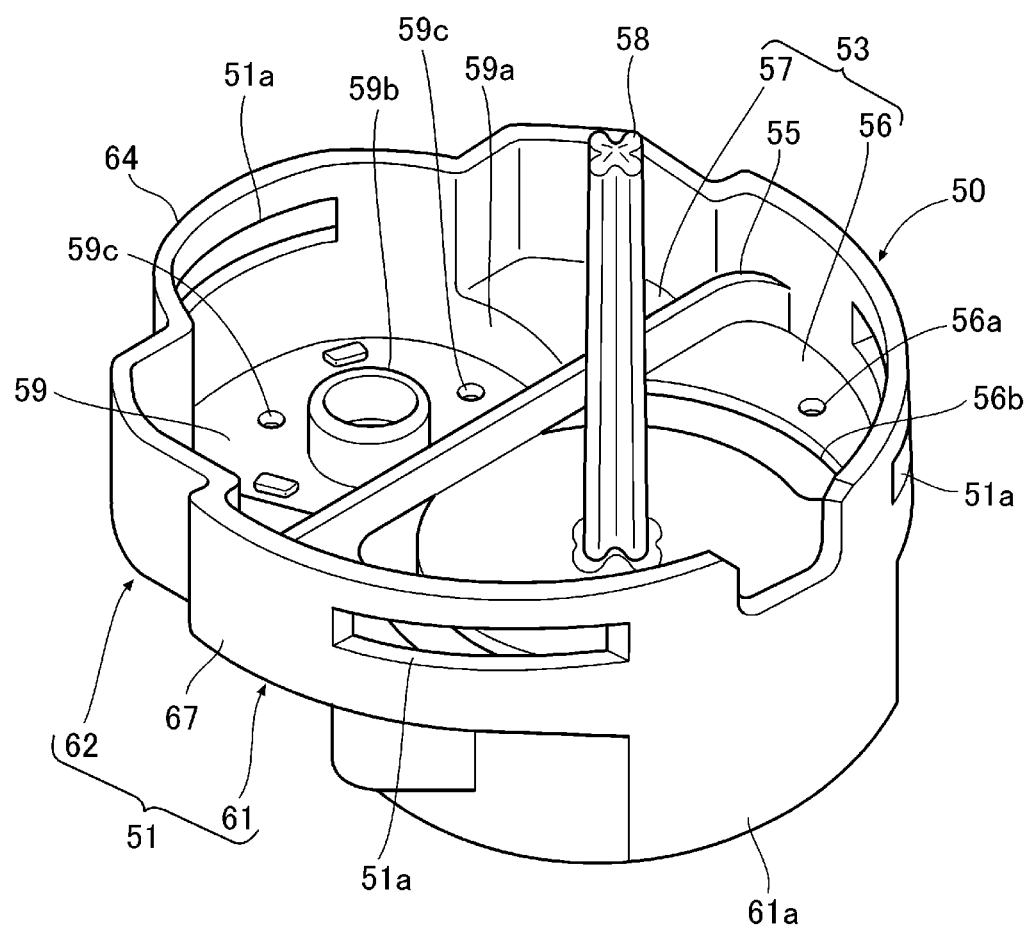
FIG. 7 is an enlarged perspective view of a lower cap constituting a housing of the valve device for a fuel tank.
Figure 8:
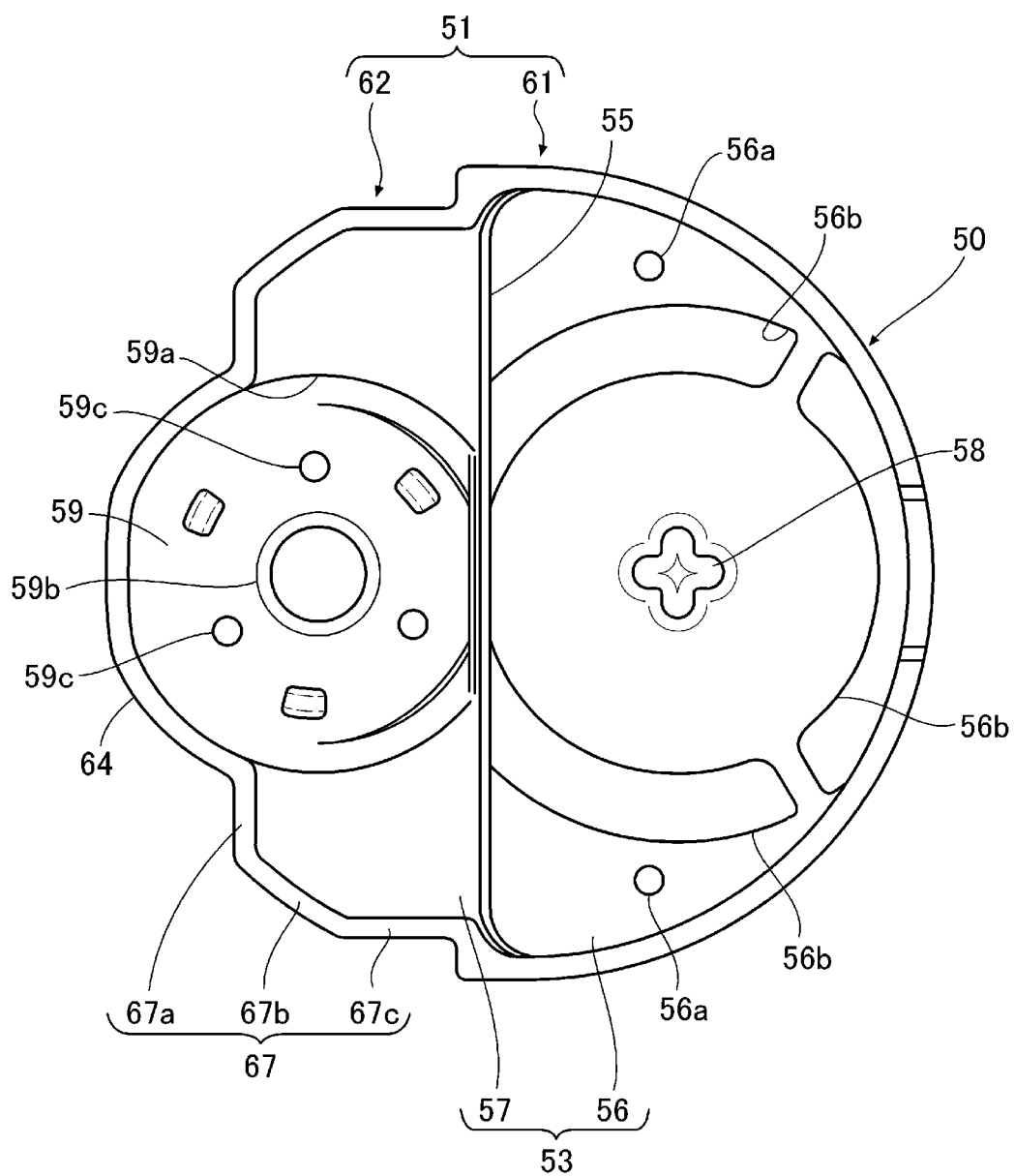
FIG. 8 is a plan view of the lower cap of the valve device for a fuel tank.

Further, as shown in FIG. 7, a tubular portion 61a is vertically provided on the first valve chamber forming wall 61 below the first valve chamber-side bottom portion 56. Although not particularly shown, the tubular portion 61a is open at the bottom and communicates with the through holes 56a and 56b of the first valve chamber-side bottom portion 56.

The shape and structure of the lower cap described above are not particularly limited as long as the lower cap has at least a cap peripheral wall having a shape fitting to the housing body peripheral wall.

Next, the upper cover 70 mounted above the housing body 20 will be described with reference to FIGS. 1 and 3 to 8.

The upper cover 70 has a substantially hat shape including a cover peripheral wall 71 having a substantially circular outer periphery, a ceiling wall 72 disposed at an upper part of the cover peripheral wall 71, and a flange portion 73 extending outward from a lower part of the cover peripheral wall 71 as viewed in the valve axis direction. As shown in FIG. 3, a discharge port 74a is formed in the cover peripheral wall 71, and a connection pipe 74 extends radially outward from a front periphery of the cover peripheral wall 71. A tube (not shown) connected to a canister disposed outside the fuel tank is connected to the connection pipe 74. The entire valve device 10 is attached to the fuel tank by welding the flange portion 73 of the upper cover 70 to a front periphery of an attachment hole of the fuel tank (not shown).

As shown in FIGS. 1 and 4, a pair of locking pieces 75, 75 extend downward from predetermined positions of the flange portion 73 in the circumferential direction, which are located on the first valve chamber V1 side. Further, as shown in FIG. 4, a pair of cover walls 77, 77 extend downward from predetermined positions of the flange portion 73 in the circumferential direction, which are located on the second valve chamber V2 side. Locking holes 75a and 77a are formed in the locking pieces 75 and the cover walls 77, respectively. Each of the cover walls 77 has an extending portion 77b extending along the circumferential direction of the cover peripheral wall 71 toward the side opposite to a formation portion of the locking hole 77a. The extending portion 77b is disposed outside the vent 47 formed in the housing body 20 to cover the vent 47 in a state in which the upper cover 70 is mounted above the housing body 20.

As shown in FIGS. 2 and 4, the second locking claws 21b of the housing body 20 are locked to the locking holes 75a of the locking pieces 75 and the locking holes 77a of the cover walls 77, respectively, so that the upper cover 70 is mounted above the housing body 20 in a state in which the seal ring 25b mounted in the ring mounting groove 25a is in contact with an inner periphery of the cover peripheral wall 71 of the upper cover 70 as shown in FIG. 3. As a result, the ventilation chamber R communicating with the outside of the fuel tank is formed above the partition wall 22 (see FIG. 3).

The shape and structure of the upper cover are not particularly limited.

As shown in FIG. 3, in the first valve chamber V1, the first float valve 80 that opens and closes the first opening 23 is accommodated and disposed in a vertically movable manner with the first biasing spring S1 interposed between the first float valve 80 and the lower cap 50. In the second valve chamber V2, the second float valve 90 that opens and closes the second opening 24 is accommodated and disposed in a vertically movable manner with the second biasing spring S2 interposed between the second float valve 90 and the lower cap 50. Both the float valves 80 and 90 rise by their own buoyancy and biasing forces of the biasing springs S1 and S2 when immersed in fuel, and fall by their own weight when not immersed in fuel.

As shown in FIGS. 1 and 3, the first float valve 80 of the present embodiment includes a float body 81 that has a circular outer periphery and generates buoyancy when immersed in fuel, and a sealing member 83 that is mounted above the float body 81, performs a vertical movement relative to the float body 81, and moves toward and away from the first opening 23. A sealing valve body 85 made of an elastic material such as rubber or an elastic elastomer is mounted above the sealing member 83. The sealing valve body 85 moves toward and away from the first opening 23 to open and close the first opening 23. Furthermore, an intermediate valve body 87 is tiltably supported between the float body 81 and the sealing member 83 (see FIG. 3). A tubular portion 81a having a substantially tubular shape is vertically provided in the float body 81. The support shaft 58 of the lower cap 50 is inserted into the tubular portion 81a, and thus the first float valve 80 is supported in a vertically movable manner (see FIG. 3). The float body 81 is formed with a spring accommodating recess 81b which is open at the bottom, and the first biasing spring S1 is accommodated in the spring accommodating recess 81b.

Further, the second float valve 90 has a float body 91 having a circular outer periphery, and a valve head 93 protruding from an upper center of the float body 91 and having a substantially triangular pyramid shape with a rounded upper end. The valve head 93 moves toward and away from the valve seat 24a of the second opening 24 to open and close the second opening 24. The float body 91 is formed with a spring accommodating recess 91a which is open at the bottom, and the second biasing spring S2 is accommodated in the spring accommodating recess 91a.

The shapes and structures of the first float valve and the second float valve are not particularly limited as long as the first opening and the second opening can be opened and closed.

Operations and Effects

Next, operations and effects of the valve device 10 configured as described above will be described.

The members constituting the valve device 10 can be assembled as follows, for example. First, the float valves 80 and 90 are accommodated in the valve chambers V1 and V2 of the housing body 20, respectively. The biasing springs S1 and S2 are accommodated in the spring accommodating recesses 81b and 91a of the float valves 80 and 90, respectively.

Thereafter, the first valve chamber forming wall 61 of the lower cap 50 is aligned with the first valve chamber forming wall 31 of the housing body 20, the second valve chamber forming wall 62 of the lower cap 50 is aligned with the second valve chamber forming wall 32 of the housing body 20, and thus the lower cap 50 is positioned below the housing body 20. In the state, the lower cap 50 is pushed into the housing body 20. Accordingly, the first locking claws 21a of the housing body 20 are locked to the corresponding locking holes 51a of the lower cap 50, so that the lower cap 50 can be assembled to the housing body 20.

At this time, in the valve device 10, when the lower cap 50 is mounted below the housing body 20, the lower cap 50 is mounted in a state in which the corresponding portions (the first valve chamber forming wall 61 and the second valve chamber forming wall 62) of the cap peripheral wall 51 are aligned with the first valve chamber forming wall 31 and the second valve chamber forming wall 32 of the housing body peripheral wall 21, respectively, and thus it is possible to reliably suppress the lower cap 50 from being erroneously assembled below the housing body 20.

As described above, when the upper cover 70 is mounted above the housing body the second locking claws 21b of the housing body 20 are locked to the locking holes 75a of the locking pieces 75 and the locking holes 77a of the cover walls 77 on the side of the upper cover 70, respectively, so that the upper cover 70 can be mounted above the housing body 20 as shown in FIG. 3.

Further, in the embodiment, the upper cover 70 has the cover peripheral wall 71 having a circular shape as viewed in the valve axis direction, the first valve chamber forming wall 31 of the housing body 20 has the concentric portion 31a provided concentrically with respect to the cover peripheral wall 71, and the second valve chamber forming wall 32 of the housing body 20 has a portion (here, the entire second valve chamber forming wall 32) positioned inside the circumscribed circle P1 of the first valve chamber forming wall 31 (see FIG. 6).

According to this aspect, since the first valve chamber forming wall 31 has the concentric portion 31a, the internal space of the first valve chamber V1 can be widely secured. Since the second valve chamber forming wall 32 has a portion located inside the circumscribed circle P1 of the first valve chamber forming wall 31, the second valve chamber V2 can be made compact while the second valve chamber forming wall 32 is formed in a different shape.

As shown in FIG. 3, in a state in which the fuel is not sufficiently supplied into the fuel tank and the first float valve 80 and the second float valve 90 are not immersed in the fuel, both the float valves 80 and 90 fall by their own weights to open the first opening 23 and the second opening 24, and thus the first valve chamber V1 and the ventilation chamber R communicate with each other through the first opening 23, and the second valve chamber V2 and the ventilation chamber R communicate with each other through the second opening 24.

When the fuel is supplied into the fuel tank in this state, mainly, air in the fuel tank flows into the first valve chamber V1 from the through holes 56a and 56b of the lower cap 50, flows upward through the gap between the first float valve 80 and the first valve chamber forming wall 31, flows into the ventilation chamber R from the first opening 23, and is discharged to the canister outside the fuel tank. Further, the air in the fuel tank flows into the second valve chamber V2 from the through hole 59c of the lower cap 50, flows upward through the main flow path 41 and the secondary flow path 42, flows into the ventilation chamber R from the second opening 24, and is discharged to the canister outside the fuel tank. Accordingly, the air in the fuel tank is discharged to the outside of the fuel tank, so that the fuel can be supplied into the fuel tank.

From the state shown in FIG. 3, when the fuel is supplied into the fuel tank, the fuel flows into the first valve chamber V1 from the through holes 56a and 56b of the lower cap 50, and the first float valve 80 is immersed in the fuel through the gap between the first float valve 80 and the first valve chamber forming wall 31. When the fuel liquid surface in the fuel tank reaches the set full-tank liquid surface, the first float valve 80 rises due to the biasing force of the first biasing spring S1 and the buoyancy of the first float valve 80 itself, and the sealing valve body 85 abuts against a rear periphery portion of the first opening 23, and thus the first opening 23 is blocked. As a result, the air flow between the first valve chamber V1 and the ventilation chamber R through the first opening 23 is blocked. Thus, the fuel in the fuel tank rises along a refueling pipe installed in the fuel tank and comes into contact with a full tank detection sensor of a refueling nozzle inserted into a refueling port to detect full tank, and thus refueling to the fuel tank is stopped and the full tank can be regulated.

When the first float valve 80 rises, the fuel flows into the second valve chamber V2 from the through hole 56b of the lower cap 50, and the second float valve 90 is immersed in the fuel. Therefore, the second float valve 90 also rises to block the second opening 24 (in a state in which both openings 23 and 24 are blocked), but when the first opening 23 is blocked by the first float valve 80, the second float valve 90 may be set not to block the second opening 24.

Figure 9:
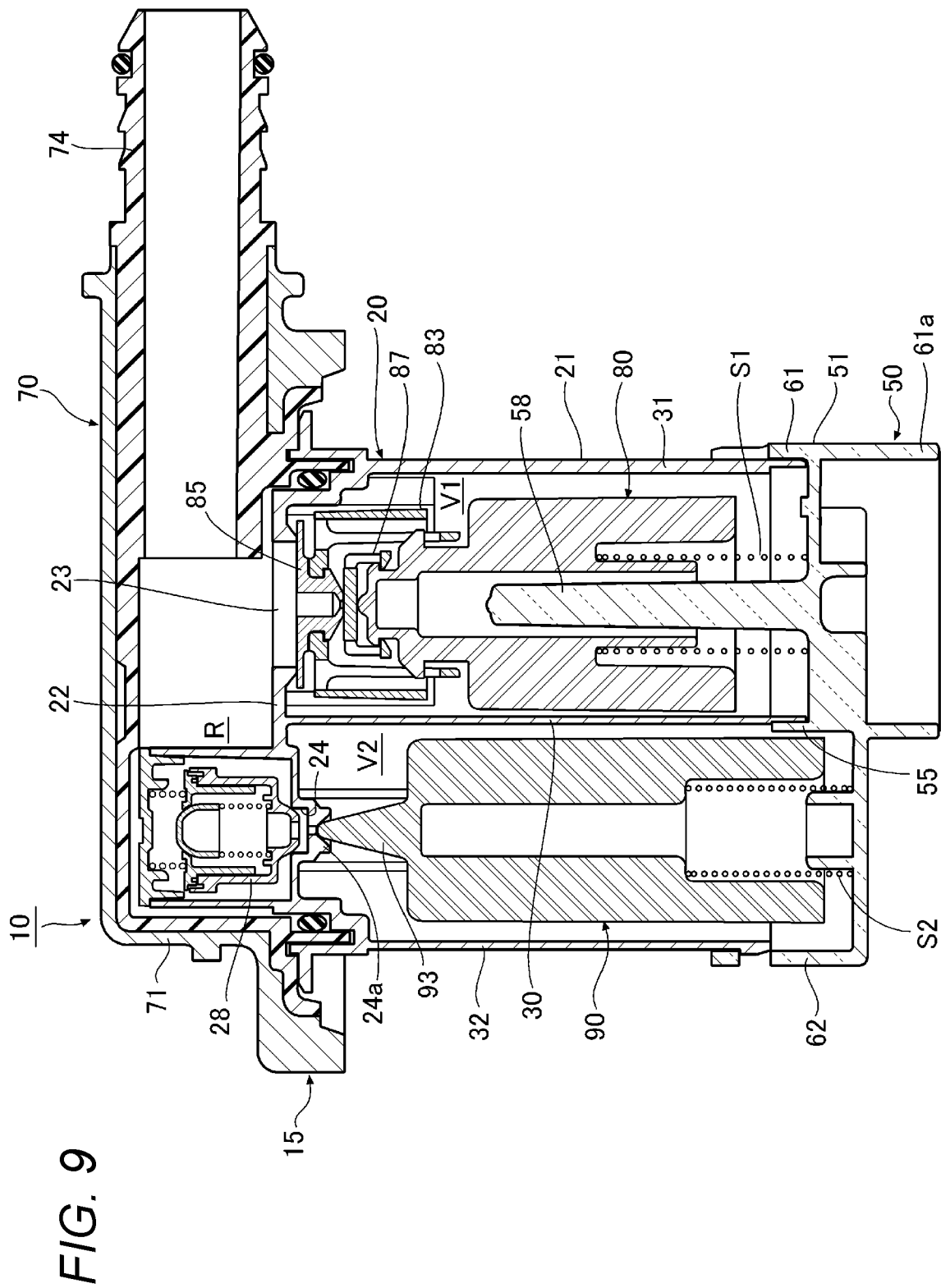
FIG. 9 is a cross-sectional view of the valve device for a fuel tank in a state in which a first float valve and a second float valve are raised.

When the vehicle turns or is largely inclined and the fuel liquid surface in the fuel tank rises, the fuel flows into the second valve chamber V2 from the through hole 59c of the lower cap 50 and the second float valve 90 is immersed in the fuel through the main flow path 41 and the secondary flow path 42. When the fuel liquid surface in the fuel tank rises to a predetermined height or more, the second float valve 90 rises due to the biasing force of the second biasing spring S2 and the buoyancy of the second float valve 90 itself, the valve head 93 abuts against the valve seat 24a, and thus the second opening 24 is blocked. At this time, the first float valve 80 also rises to block the first opening 23. As a result, as shown in FIG. 9, both the openings 23 and 24 are blocked, and the fuel is suppressed from flowing into the ventilation chamber R through both the openings 23 and 24, thereby suppressing the fuel from leaking out of the fuel tank.

In the embodiment, the lower cap 50 is provided with the support shaft 58 for guiding a vertical movement of the first float valve 80 (see FIG. 7), and the concentric portion 31a of the first valve chamber forming wall 31 has a semicircular shape (see FIG. 6).

According to this aspect, the guide rib for guiding the vertical movement of the first float valve 80 is not necessary, and the internal space of the first valve chamber V1 can be utilized without waste. Since the concentric portion 31a of the first valve chamber forming wall 31 has a semicircular shape, a maximum internal space of the first valve chamber V1 can be secured.

In the embodiment, as shown in FIG. 4, the second float valve 90 is disposed between the outer arcuate wall 34 provided in the second valve chamber forming wall 32 and the inner arcuate wall 35 disposed in the second valve chamber V2. Therefore, the second float valve 90 can be guided to move vertically while reducing rattling at the time of the vertical movement.

Further, fuel vapor generated in the fuel tank due to swing of the vehicle or the like mainly passes through the main flow path 41 provided in the second valve chamber V2, and is discharged from the second opening 24 into the ventilation chamber R. At this time, since the flow path area of the main flow path 41 can be secured to be relatively large (for example, the flow path area can be made larger than that of the secondary flow path 42), the fuel vapor as described above can be quickly discharged to the ventilation chamber R, and the second float valve 90 can be suppressed from being blown up (the second float valve 90 rises to block the second opening 24 at a pressure smaller than a set closing valve pressure).

Further, as shown in FIG. 4, the first valve chamber forming wall 31 has the bulging portion 31b having a bulging shape with respect to the connection portion 37d between the second valve chamber forming wall 32 and the division wall 30 as viewed in the valve axis direction, the vent 47 communicating with the second valve chamber V2 is formed at a position adjacent to the bulging portion 31b, which is the upper part of the second valve chamber forming wall 32, and the cover wall 77 extending downward and disposed outside the vent 47 is provided in the upper cover 70.

According to the above aspect, since the vent 47 communicating with the second valve chamber V2 is formed at the position adjacent to the bulging portion 31b in the second valve chamber forming wall 32, the air in the fuel tank can flow into the second valve chamber V2 through the vent 47 after the second float valve 90 rises to block the second opening 24, and the second opening 24 can be easily opened again.

Since the upper cover 70 is provided with the cover wall 77 which extends downward and is disposed outside the vent 47, it is possible to make it difficult for the fuel to flow into the second valve chamber V2 from the vent 47 when the fuel swings (here, the vent 47 is covered by the extending portion 77b of the cover wall 77 to make it difficult for the fuel to flow into the second valve chamber V2), and it is possible to make it difficult for the fuel to be discharged from the second opening 24 to the ventilation chamber R.

As shown in FIG. 4, the upper space 46 surrounded by the main flow path forming wall 37, the division wall 30, and the extension wall 45 extending from the inner arcuate wall 35 toward the main flow path forming wall 37 is formed above the main flow path 41, and the vent 47 is formed in the main flow path forming wall 37 so as to communicate with the upper space 46.

According to the aspect, since the vent 47 is formed in the main flow path forming wall 37 so as to communicate with the upper space 46, even when the fuel flows into the second valve chamber V2 from the vent 47 during swing of the fuel, the fuel is less likely to enter the second opening 24. That is, since the upper space 46 is blocked at the top, is blocked at the side other than the vent 47, and is open at the bottom, the fuel flowing into the upper space 46 through the vent 47 temporarily stays in the upper space 46 and then falls downward, and thus the fuel is less likely to enter the second opening 24.

(Another Embodiment of Valve Device for Fuel Tank)

FIGS. 10 to 16 show another embodiment of the valve device for a fuel tank according to the present invention. The same reference numerals are given to substantially the same parts as those in the above embodiment, and the description thereof will be omitted.

Figure 10:
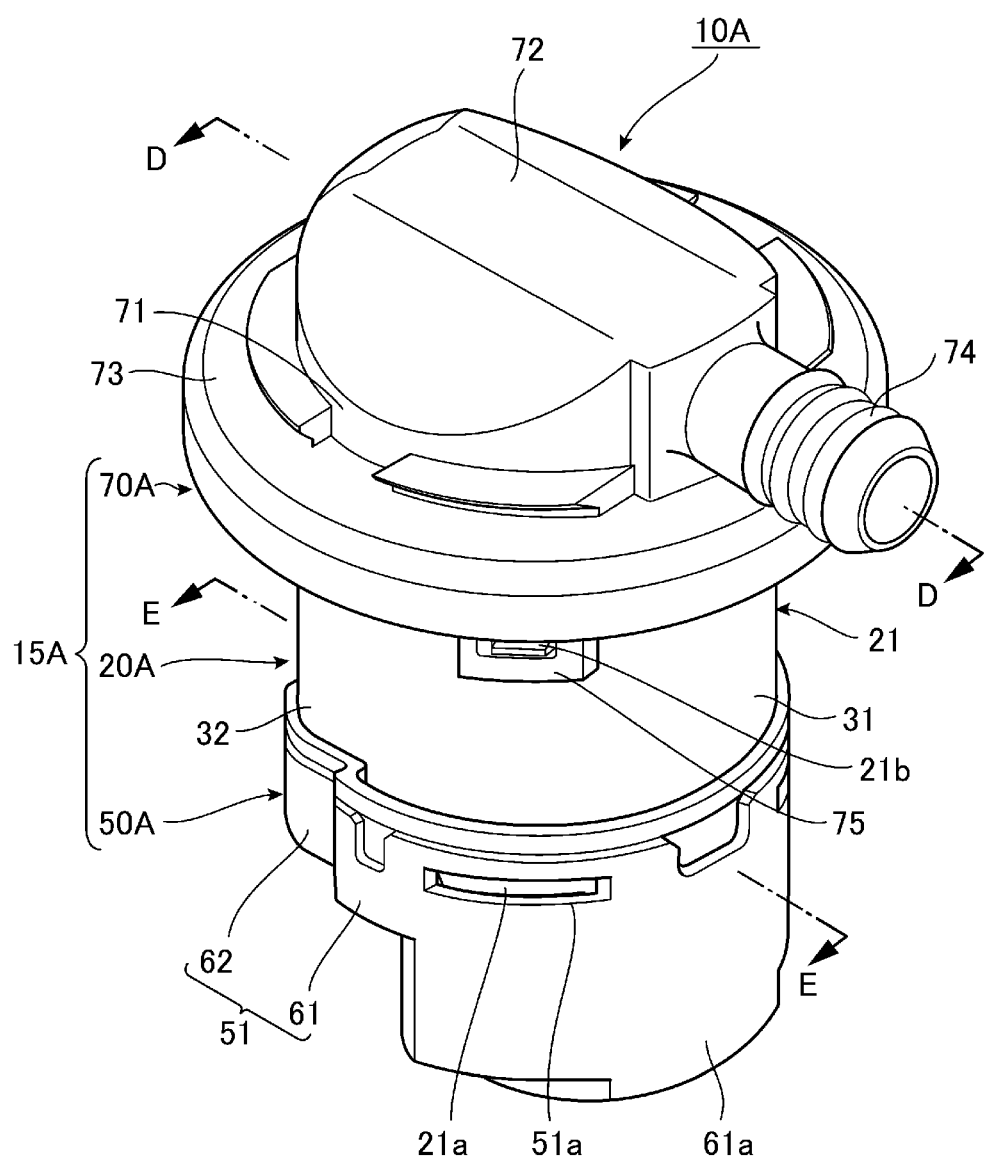
FIG. 10 is a perspective view showing another embodiment of the valve device for a fuel tank according to the present invention.
Figure 14:
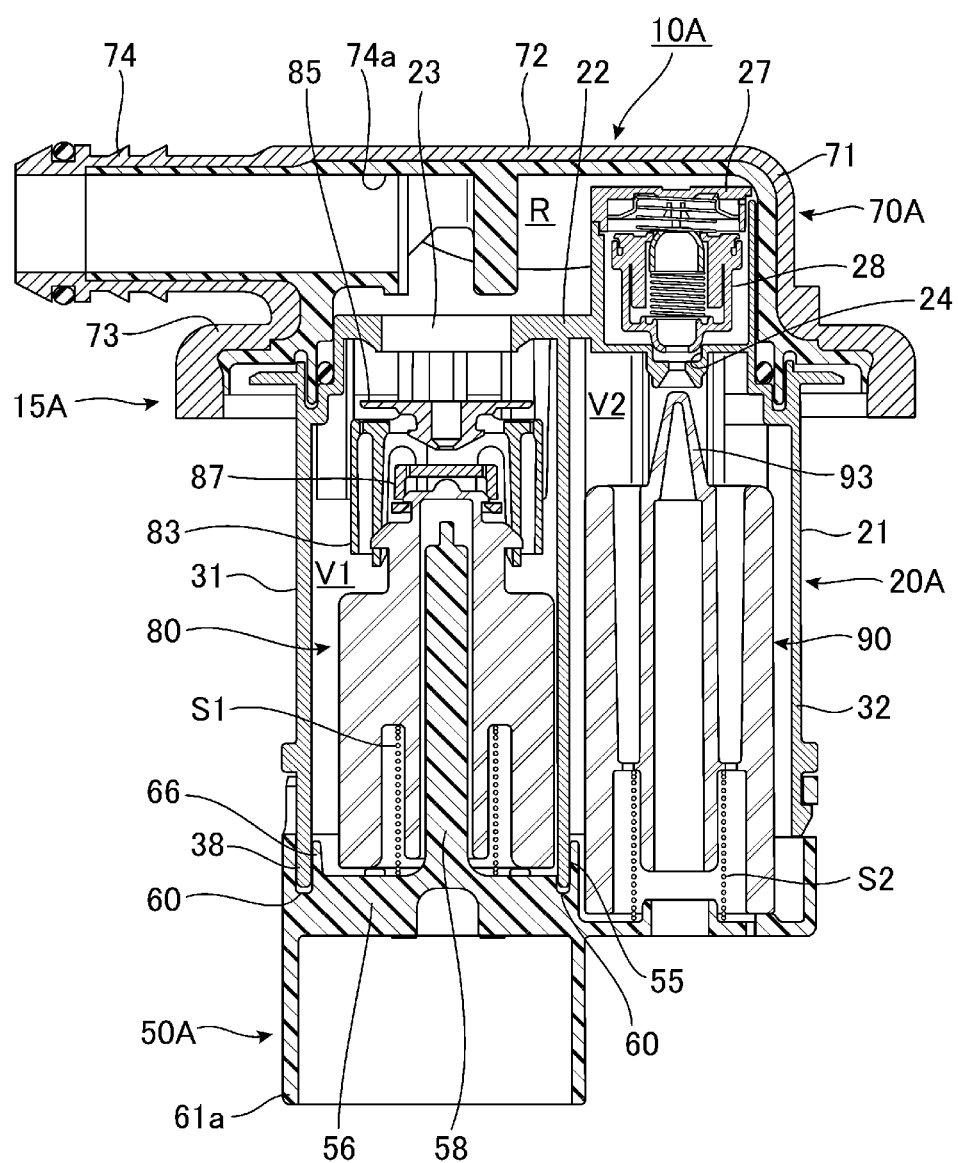
FIG. 14 is a cross-sectional view taken along an arrow line D-D of FIG. 10.

As shown in FIGS. 10 and 14, a valve device 10A for a fuel tank (hereinafter, also simply referred to as a "valve device 10A") of the embodiment mainly includes a housing a first float valve 80, a second float valve 90, a first biasing spring S1 for biasing the first float valve 80, and a second biasing spring S2 for biasing the second float valve 90, as in the embodiment shown in FIGS. 1 to 9. The housing 15A includes a housing body 20A, a lower cap 50A mounted below the housing body 20A, and an upper cover 70A mounted above the housing body 20A.

Figure 11:
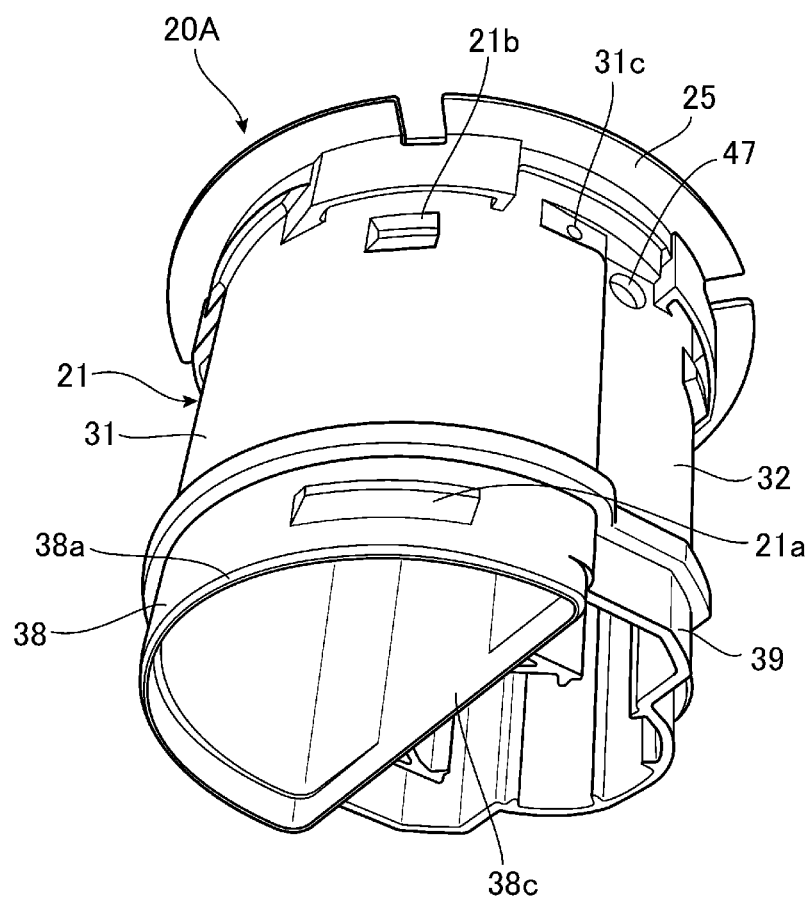
FIG. 11 is a perspective view of a housing body constituting a housing of the valve device for a fuel tank, as viewed from a direction different from that of FIG. 10.
Figure 12:
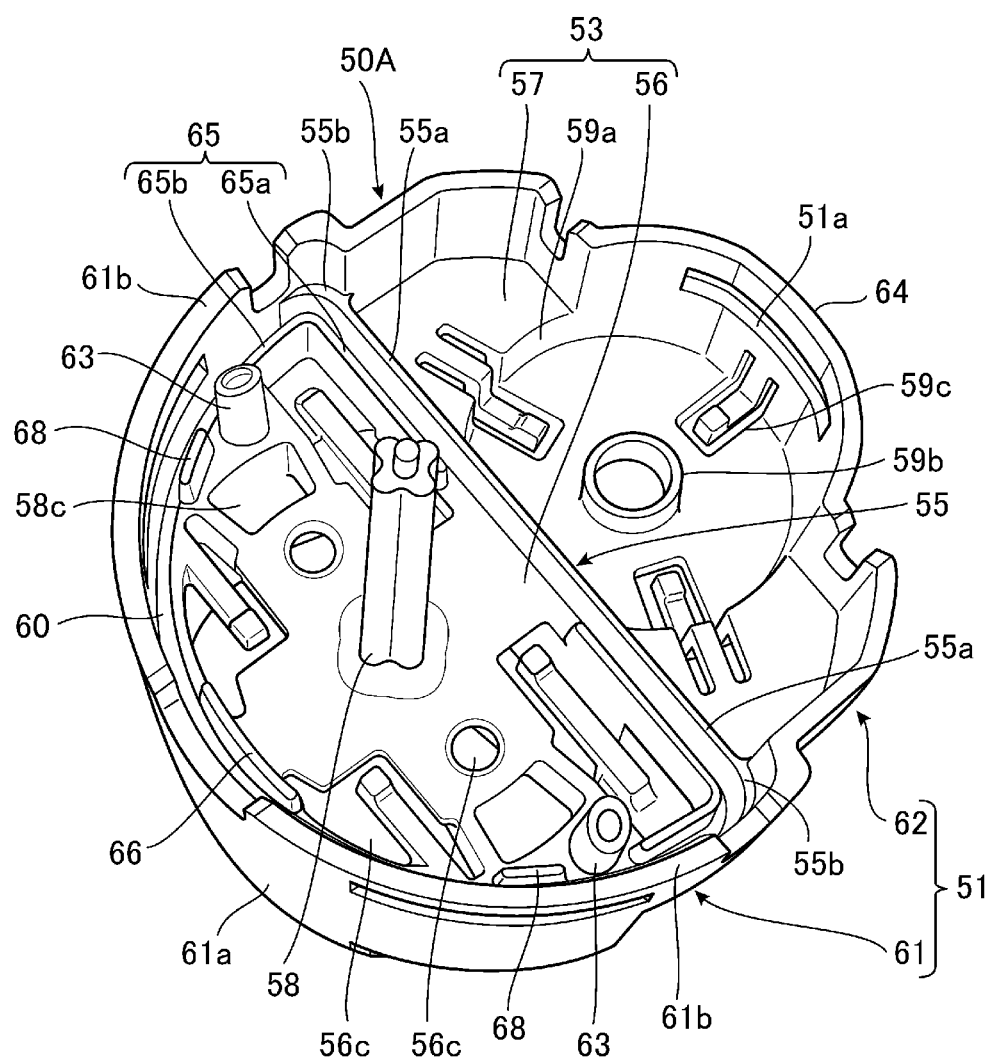
FIG. 12 is a perspective view of a lower cap constituting a housing of the valve device for a fuel tank, as viewed from a direction different from that of FIG. 10.
Figure 13:
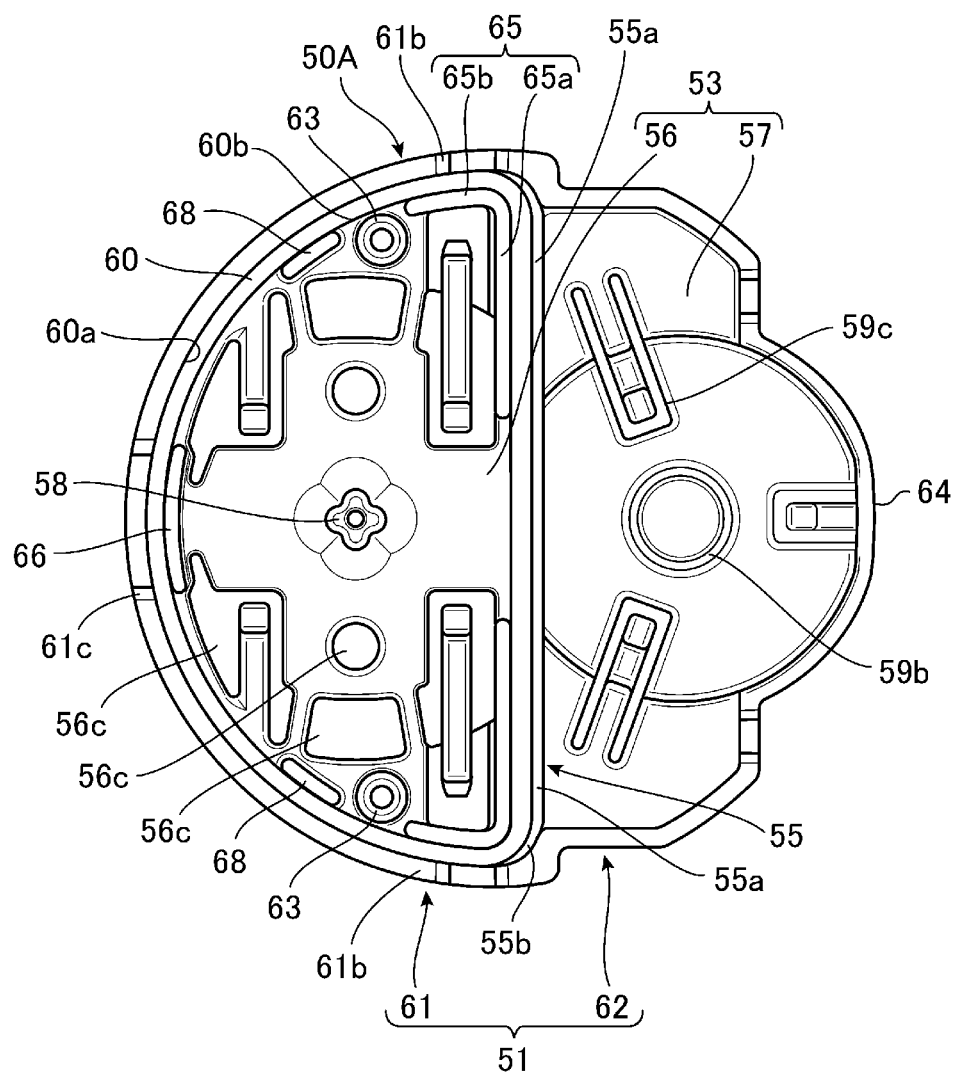
FIG. 13 is a plan view of the lower cap of the valve device for a fuel tank.

Further, as shown in FIG. 11, the housing body peripheral wall 21 of the housing body 20A includes the first valve chamber forming wall 31 that forms an outer periphery of the first valve chamber V1, and the second valve chamber forming wall 32 that forms an outer periphery of the second valve chamber V2. Further, as shown in FIGS. 12 to 14, the lower cap has a cap peripheral wall 51 having a shape fitting to the housing body peripheral wall 21, and a groove 60 is formed in the bottom portion 53 of the lower cap 50A such that a lower end 38 of the first valve chamber forming wall 31 enters the groove but a lower end 39 of the second valve chamber forming wall 32 does not enter the groove.

First, a specific structure of the housing body 20A will be described in detail.

The lower end 38 in the axial direction of the first valve chamber forming wall 31 constituting the housing body 20A in the embodiment protrudes downward by a predetermined length from a lower end surface of the lower end 39 of the second valve chamber forming wall 32 in the axial direction (see FIG. 11). That is, in the embodiment, the lower ends 38 and 39 of both forming walls 31 and 32 have different lengths in the axial direction, and the lower end 38 of the first valve chamber forming wall 31 extends longer downward than the lower end 39 of the second valve chamber forming wall 32. As shown in FIG. 11, the lower end 38 of the first valve chamber forming wall 31 has a linear portion 38c having a shape linearly extending in conformity with the division wall 55 of the lower cap 50A.

As a result, the lower end 38 of the first valve chamber forming wall 31 can enter the groove 60 of the lower cap 50A, but the lower end 39 of the second valve chamber forming wall 32 cannot enter the groove 60 of the lower cap 50A. That is, since the first float valve 80 that functions as a full tank regulation valve is accommodated in the first valve chamber V1, it is necessary to ensure airtightness (also referred to as sealing performance) (because, when the airtightness of the first valve chamber V1 decreases, full tank regulation is not performed at a predetermined fuel liquid surface, and full tank detection accuracy may decrease). Further, since the second float valve 90 that functions as a fuel leakage suppression valve is accommodated in the second valve chamber V2, it is not necessary to ensure airtightness (because the second float valve 90 may rise as the fuel surface rises in the second valve chamber V2). Accordingly, the lower end 38 of the first valve chamber forming wall 31 enters the groove 60 of the lower cap 50A because of the necessity of ensuring the airtightness of the first valve chamber V1, while the lower end 39 of the second valve chamber forming wall 32 does not enter the groove 60 of the lower cap 50A because the necessity of ensuring the airtightness of the second valve chamber V2 is small.

As in the above embodiment, the first valve chamber forming wall 31 and the second valve chamber forming wall 32 have different contour shapes as viewed in the valve axis direction.

As shown in FIG. 11, an outer peripheral surface of the lower end 38 of the first valve chamber forming wall 31 is formed with a tapered surface 38a that becomes thinner gradually toward the lowermost end in the axial direction. Further, as shown in FIG. 15B, an inner peripheral surface of the lower end 38 of the first valve chamber forming wall 31 is also formed with a tapered surface 38b that becomes thinner gradually toward the lowest end in the axial direction. The tapered surfaces 38a and 38b facilitate the lower end 38 of the first valve chamber forming wall 31 to enter the groove 60 of the lower cap 50A.

Further, the lower end 38 of the first valve chamber forming wall 31 is press-fitted into the groove 60 formed on an entire periphery of the bottom portion (the first valve chamber-side bottom portion 56) of the lower cap 50A at the first valve chamber V1 side.

An outer dimension L1 (a length from a predetermined position K of the first valve chamber V1 to an outer surface of the first valve chamber forming wall 31) of the first valve chamber forming wall 31 and an outer dimension of the division wall 55 (a length from the predetermined position K of the first valve chamber V1 to an outer surface of the division wall 55) are larger than a dimension L2 (a length from the predetermined position K of the first valve chamber V1) of an inner surface 60a of the groove 60 on an outer diameter side. As a result, when the lower end 38 of the first valve chamber forming wall 31 is inserted into the groove 60 of the lower cap 50A, an outer periphery of the lower end 38 of the first valve chamber forming wall 31 is pressed against an inner periphery of the cap-side first valve chamber forming wall 61, and the lower end 38 is inserted (herein, press-fitted) into the groove 60 while being bent and deformed inward in a radial direction of the first valve chamber V1 (see a two-dot chain line in FIG. 15B). At this time, an outer periphery of the linear portion 38c of the lower end 38 of the first valve chamber forming wall 31 is guided by an inner periphery of the division wall 55.

As described above, in a state in which the lower end 38 of the first valve chamber forming wall 31 is press-fitted into the groove 60, the first valve chamber forming wall 31 that has been bent and deformed elastically returns outward in the radial direction of the first valve chamber V1 (see an arrow in FIG. 15B), and the lower end 38 of the first valve chamber forming wall 31 is strongly pressed against the inner surface 60a of the groove 60 on the outer diameter side, and thus the airtightness of the first valve chamber V1 is ensured. Further, an inner peripheral portion of the lower end 38 of the first valve chamber forming wall 31 is brought into contact with an inner surface 60b of the groove 60 on an inner diameter side (see FIG. 15A), thereby suppressing excessive deformation of the lower end 38. That is, in the embodiment, the outer peripheral surface of the lower end 38 of the first valve chamber forming wall 31 and the inner surface 60a of the groove 60 on the outer diameter side mainly function as a pressure contact portion for ensuring airtightness of the first valve chamber V1. Further, the inner surface 60b of the groove 60 on the inner diameter side functions as a deformation suppression portion of the lower end 38 of the first valve chamber forming wall 31 inserted into the groove 60.

Next, a specific structure of the lower cap 50A will be described in detail.

The lower cap 50A in the embodiment has the bottom portion 53 provided at a lower part of the cap peripheral wall 51, and the division wall 55 that divides an internal space of the lower cap 50A into a first valve chamber V1 and a second valve chamber V2 is erected from the bottom portion 53. The division wall 55 divides an internal space of the housing body 20A into a first valve chamber V1 and a second valve chamber V2, and has a linearly extending portion 55a (hereinafter, also simply referred to as a "linear portion 55a") (see FIG. 12). Both end portions 55b, 55b of the division wall 55 in the extending direction are curved.

The bottom portion 53 is divided into the first valve chamber-side bottom portion 56 located at the first valve chamber V1 side and the second valve chamber-side bottom portion 57 located at the second valve chamber V2 side via the division wall 55. Further, the cap peripheral wall 51 includes the cap-side first valve chamber forming wall 61 fitting to the first valve chamber forming wall 31 of the housing body peripheral wall 21 and the cap-side second valve chamber forming wall 62 fitting to the second valve chamber forming wall 32 of the housing body peripheral wall 21. The cap-side first valve chamber forming wall 61 means a "cap peripheral wall on the side of the first valve chamber" in the present invention. Further, tubular portions 63, 63 are erected inside both ends 61b, 61b of the cap-side first valve chamber forming wall 61 of the bottom portion 53 in the circumferential direction. A plurality of through holes 56c having a predetermined shape are formed in the first valve chamber-side bottom portion 56.

As shown in FIGS. 12 and 13, the groove 60 is formed over an entire periphery of the first valve chamber-side bottom portion 56 located at the first valve chamber V1 side.

Figure 16:
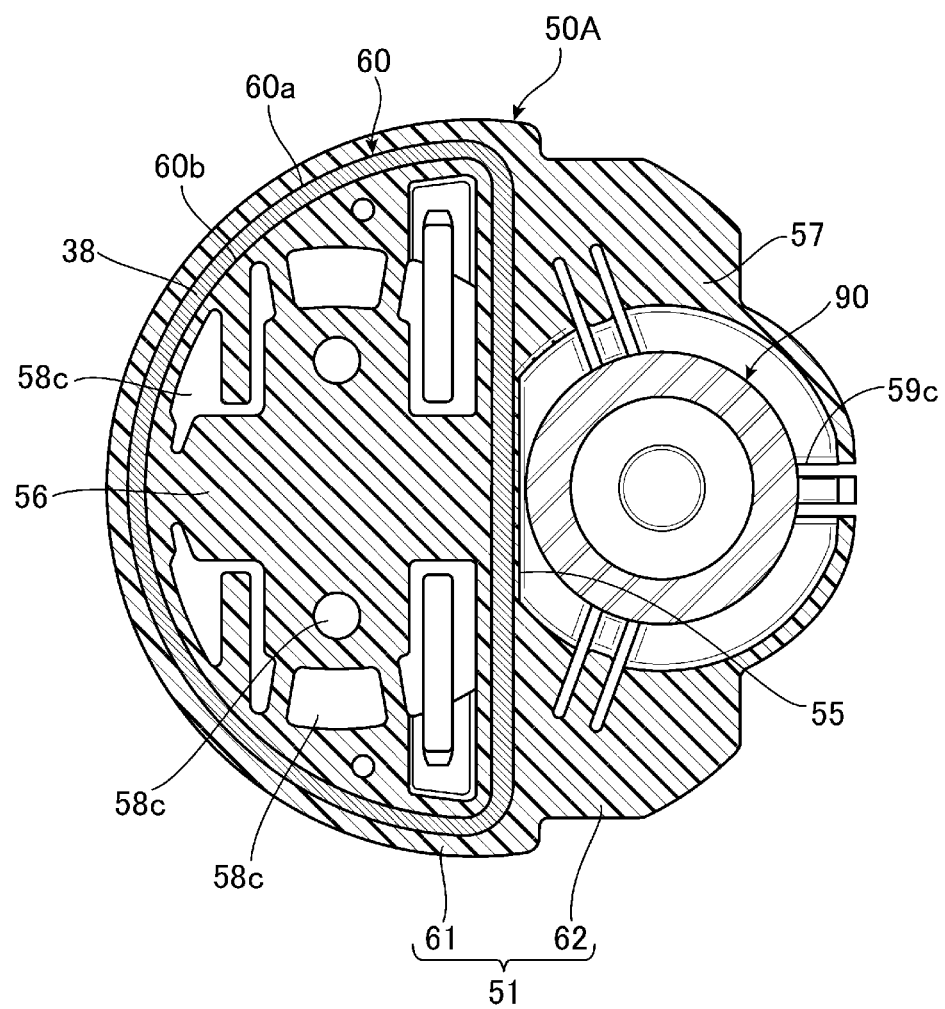
FIG. 16 is a cross-sectional view taken along an arrow line E-E of FIG. 10.

The groove 60 in the embodiment extends along the inner periphery of the cap-side first valve chamber forming wall 61 and the inner periphery of the division wall 55, and is continuously formed over the entire periphery of the first valve chamber-side bottom portion 56 (formed so that there is no cut-off portion during extension). In other words, in the lower cap 50A of the embodiment, the cap-side first valve chamber forming wall 61 and the division wall 55 are erected from an edge of the inner surface 60a of the groove 60 on the outer diameter side. As shown in FIG. 16, the entire lower end 38 of the first valve chamber forming wall 31 is press-fitted into the entire periphery of the groove 60.

Further, as shown in FIGS. 12 and 13, guide walls 65, 66, and 68 which are erected from an edge of the inner surface 60b of the groove 60 on the inner diameter side and which extend along the groove 60 are provided at least partially in the circumferential direction of the groove 60.

In the embodiment, first guide walls 65, 65 are provided within a range extending over both ends 61a, 61a of the cap-side first valve chamber forming wall 61 in the circumferential direction from the edge of the inner surface 60b of the groove 60 on the inner diameter side, excluding a central portion of the linear portion 55a of the division wall 55. Each of the first guide walls 65 includes a linear portion 65a extending linearly, and a bent portion 65b bent and extending from one end of the linear portion 65a in a longitudinal direction via an arcuate portion. The linear portion 65a of the first guide wall 65 is erected from the edge of the inner surface 60b of the groove 60 on the inner diameter side, and extends in parallel so as to be parallel to the linearly extending portion (the linear portion 55a) of the division wall 55 (see FIG. 13).

A second guide wall 66 is provided at the edge of the inner surface 60b of the groove 60 on the inner diameter side and provided inside a central portion 61c of the cap-side first valve chamber forming wall 61 in the circumferential direction. Further, a third guide portion 68 is provided at a position closer to each of both ends 61b, 61b of the cap-side first valve chamber forming wall 61 in the circumferential direction and closer to the central portion 61c in the circumferential direction than the tubular portion 63, which is located at the edge of the inner surface 60b of the groove 60 on the inner diameter side. When the lower end 38 of the first valve chamber forming wall 31 is inserted into the groove 60 of the lower cap the guide walls 65, 66, and 68 abut against and guide the inner periphery of the lower end 38 of the first valve chamber forming wall 31 that is bent and deformed inward in the radial direction of the first valve chamber V1.

Operations and Effects

Next, operations and effects of the valve device 10A configured as described above will be described.

That is, the float valves 80 and 90 and the biasing springs S1 and S2 are accommodated in the valve chambers V1 and V2 of the housing body 20A, the lower end 38 of the first valve chamber forming wall 31 of the housing body 20A is aligned with the groove 60 of the lower cap 50A, and then the lower cap 50A is pressed into the housing body 20A as indicated by an arrow in FIG. 15A.

Thus, the outer periphery of the lower end 38 of the first valve chamber forming wall 31 is pressed against the inner periphery of the cap-side first valve chamber forming wall 61 and is bent and deformed inward in the radial direction of the first valve chamber V1, and the outer periphery of the linear portion 38c of the lower end 38 of the first valve chamber forming wall 31 is guided by the inner periphery of the division wall 55, the lower cap 50A is pressed while the inner periphery of the lower end 38 of the first valve chamber forming wall 31 is guided by the plurality of guide walls 65, 66, and 68, and the lower end 38 of the first valve chamber forming wall 31 is press-fitted into the groove 60 as shown in (FIG. 15B. In the state in which the lower end 38 of the first valve chamber forming wall 31 is press-fitted into the groove 60, the first valve chamber forming wall 31 that has been bent and deformed elastically returns outward in the radial direction of the first valve chamber V1 (see the arrow in FIG. 15B), and thus the lower end 38 of the first valve chamber forming wall 31 is strongly pressed against the inner surface 60a of the groove 60 on the outer diameter side. That is, as indicated by the two-dot chain line in FIG. 15B, the outer peripheral portion of the lower end 38 of the first valve chamber forming wall 31 is pressed against the inner surface 60a of the groove 60 on the outer diameter side so as to overlap with the inner surface 60a. The inner peripheral portion of the lower end 38 of the first valve chamber forming wall 31 abuts against the inner surface 60b of the groove 60 on the inner diameter side, thereby suppressing the deformation thereof. Accordingly, the lower end 38 of the first valve chamber forming wall 31 is configured such that the outer peripheral portion thereof is pressed against the inner surface 60a of the groove 60 on the outer diameter side and the inner peripheral portion thereof abuts against the inner surface 60b of the groove 60 on the inner diameter side.

Thereafter, the first locking claws 21a of the housing body 20A are locked to the corresponding locking holes 51a of the lower cap 50A, so that the lower cap 50A can be assembled below the housing body 20A.

In the valve device 10A, the groove 60 is formed in the bottom portion 53 of the lower cap 50A such that the lower end 38 of the first valve chamber forming wall 31 enters the groove but the lower end 39 of the second valve chamber forming wall 32 does not enter the groove. Therefore, when the lower cap 50A is mounted below the housing body 20A, it is necessary to align the lower end 38 of the first valve chamber forming wall 31 with the groove 60 of the lower cap 50A, and thus it is possible to reliably suppress the lower cap 50A from being erroneously assembled below the housing body 20.

Further, in the embodiment, the groove 60 is formed over the entire periphery of the bottom portion 53 located at the first valve chamber V1 side of the lower cap 50A, and the lower end 38 of the first valve chamber forming wall 31 is press-fitted into the groove 60 (FIG. 16). In particular, the outer periphery of the lower end 38 of the first valve chamber forming wall 31 is pressed against the inner surface 60a of the groove 60 on the outer diameter side.

According to the above aspect, the sealing performance between the lower end 38 of the first valve chamber forming wall 31 and the inner periphery (particularly, the inner surface 60a on the outer diameter side) of the groove 60 of the lower cap 50A can be enhanced. As a result, when the fuel is supplied and the liquid surface in the fuel tank reaches near the set full-tank liquid surface, the first float valve 80 raised in the first valve chamber V1 reliably blocks the first opening 23, and thus the full-tank regulation is firmly performed to suppress excessive refueling. When the sealing performance is low, air, fuel vapor, or the like may leak from a gap between the lower end 38 of the first valve chamber forming wall 31 and the groove 60 at the time of refueling, and the pressure in the first valve chamber V1 may be less likely to rise, and as a result, the first float valve 80 may not block the first opening 23 even when the liquid surface of the fuel reaches near the set full-tank liquid surface. The entire lower end 38 of the first valve chamber forming wall 31 is press-fitted into the entire periphery of the groove 60 (see FIG. 16), and the entire groove 60 is covered by the lower end 38 of the first valve chamber forming wall 31, and thus it is possible to effectively suppress fuel or air from leaking from the groove 60.

Further, in the embodiment, the cap peripheral wall (the cap-side first valve chamber forming wall 61) on the first valve chamber V1 side and the division wall 55 are erected from the edge of the inner surface 60a of the groove 60 on the outer diameter side. When the lower end 38 of the first valve chamber forming wall 31 is inserted into the groove 60, the lower end 38 of the first valve chamber forming wall 31 is pressed against the inner periphery of the cap peripheral wall on the first valve chamber side, and the outer periphery of the lower end 38 is pressed against the inner surface 60a of the groove 60 on the outer diameter side, and the outer periphery of the linear portion 38c, which fits to the division wall of the lower end 38 of the first valve chamber forming wall 31 is guided by the outer periphery of the division wall 55.

According to the above aspect, when the lower end 38 of the first valve chamber forming wall 31 is inserted into the groove 60 of the lower cap 50A in order to mount the lower cap 50A below the housing body 20A, the outer periphery of the lower end 38 of the first valve chamber forming wall 31 is pressed against the inner periphery of the cap-side first valve chamber forming wall 61 and is press-fitted into the groove 60 while being bent and deformed inward, and thus the lower end 38 of the first valve chamber forming wall 31 to be elastically returned is pressed against the inner surface 60a of the groove 60 on the outer diameter side (see FIG. 15B). As a result, it is possible to further improve the sealing performance between the lower end 38 of the first valve chamber forming wall 31 and the inner periphery of the groove 60 of the lower cap 50A, and to more reliably perform full-tank regulation. Since the outer periphery of the linear portion 38c, which fits the partition wall 55, of the lower end 38 of the first valve chamber forming wall 31 is guided by the outer periphery of the division wall 55, the lower end 38 of the first valve chamber forming wall 31 can be easily inserted into the groove 60.

In the embodiment, the guide walls 65, 66, and 68 which are erected from the edge of the inner surface 60b of the groove 60 on the inner diameter side and which extend along the groove 60 are provided at least partially in the circumferential direction of the groove 60.

According to the above aspect, when the lower end 38 of the first valve chamber forming wall 31 is inserted into the groove 60 of the lower cap 50A in order to mount the lower cap 50A below the housing body 20A, the inner periphery of the lower end 38 of the first valve chamber forming wall 31 is inserted while being guided by the guide walls 65, 66, and 68, and thus the insertability of the lower end 38 of the first valve chamber forming wall 31 into the groove 60 can be enhanced. In the state in which the lower end 38 of the first valve chamber forming wall 31 is inserted into the groove 60, even if the lower end 38 of the first valve chamber forming wall 31 is deformed due to swelling of the fuel when the lower cap 50A is immersed in the fuel, the deformation can be suppressed by the guide walls 65, 66, and 68.

Further, in the embodiment, the lower cap 50A has the division wall 55 that divides the inner space of the housing body 20A into the first valve chamber V1 and the second valve chamber V2, the division wall 55 has the linearly extending portion (the linear portion 55a), and the guide wall 65 has the portion (the linear portion 65a) that is erected from the edge of the inner surface 60b of the groove 60 on the inner diameter side and that extends in parallel with the linear portion 55a of the division wall 55 (see FIG. 13).

When the lower end 38 of the first valve chamber forming wall 31 is inserted into the groove 60 of the lower cap 50A in order to mount the lower cap 50A below the housing body 20A, the linearly extending portion 38*c* (see FIG. 11) of the lower end 38 of the first valve chamber forming wall 31 is easily bent and deformed inward. However, in the embodiment, since the guide wall 65 has the portion (the linear portion 65*a*) that is erected from the edge of the inner surface 60*b* of the groove 60 on the inner diameter side and that extends in parallel with the linear portion 55*a* of the division wall 55, even when the linearly extending portion 38*c* of the lower end 38 of the first valve chamber forming wall 31 is bent and deformed inward as described above, the linear portion 65*a* of the guide wall 65 receives the deformation, and thus the deformation can be suppressed. As a result, the lower end 38 of the first valve chamber forming wall 31 can be easily inserted into the groove 60.

The present invention is not limited to the embodiment described above, various modifications can be made within the scope of the gist of the present invention, and such embodiments are also included in the scope of the present invention.

REFERENCE SIGNS LIST

10, 10A: valve device for a fuel tank (valve device)
15,15A housing
20,20A housing body
21: housing body peripheral wall
22: partition wall
23: first opening
24: second opening
30: division wall
31: first valve chamber forming wall
31*a*: concentric portion
31*b*: bulging portion
31*c*: vent
32: second valve chamber forming wall
34: outer arcuate wall
35: inner arcuate wall
37: main flow path forming wall
41: main flow path
45: extension wall
46: upper space
47: vent
50, 50A: lower cap
51: cap peripheral wall
60: groove
61: first valve chamber forming wall
64: outer arcuate wall
65, 66, 68: guide wall
67: main flow path forming wall
70: upper cover
71: cover peripheral wall
80: first float valve
90: second float valve
R: ventilation chamber
S1: first biasing spring
S2: second biasing spring
V1: first valve chamber
V2: second valve chamber

The invention claimed is:

1. A valve device for a fuel tank comprising:
a housing provided with a first valve chamber and a second valve chamber which are configured to communicate with an inside of the fuel tank below a partition wall and a ventilation chamber configured to communicate with an outside of the fuel tank above the partition wall, in which the partition wall is provided with a first opening through which the first valve chamber is to communicate with the ventilation chamber and a second opening through which the second valve chamber is to communicate with the ventilation chamber;
a first float valve accommodated in the first valve chamber in a vertically movable manner and configured to block the first opening when a liquid surface in the fuel tank reaches near a set full-tank liquid surface; and
a second float valve accommodated in the second valve chamber in a vertically movable manner and configured to block the second opening when the liquid surface in the fuel tank rises to a predetermined height or more, wherein
the housing includes a housing body and a lower cap mounted below the housing body,
the housing body has a housing body peripheral wall that is open at a bottom,
the housing body peripheral wall has a first valve chamber forming wall that forms an outer periphery of the first valve chamber, and a second valve chamber forming wall that has a contour shape different from that of the first valve chamber forming wall as viewed in a valve axis direction and that forms an outer periphery of the second valve chamber,
the lower cap has a cap peripheral wall having a shape fitting to the housing body peripheral wall, and
the second valve chamber forming wall has an outer arcuate wall located inside a circumscribed circle of the first valve chamber forming wall as viewed in the valve axis direction, and a circumscribed circle of the outer arcuate wall is smaller than the circumscribed circle of the first valve chamber forming wall.

2. The valve device for the fuel tank according to claim 1, wherein
the housing further includes an upper cover mounted above the housing body, and the upper cover includes a cover peripheral wall having a circular shape as viewed in the valve axis direction,
the first valve chamber forming wall has a concentric portion provided concentrically with respect to the cover peripheral wall,
the lower cap is provided with a support shaft configured to guide a vertical movement of the first float valve, and
the concentric portion has a semicircular shape.

3. The valve device for the fuel tank according to claim 1, wherein
the housing further includes an upper cover mounted above the housing body,
the housing body includes a division wall configured to divide an inner space of the housing body into the first valve chamber and the second valve chamber,
the first valve chamber forming wall has a bulging portion having a bulging shape with respect to a connection portion between the second valve chamber forming wall and the division wall as viewed in the valve axis direction,
a vent configured to communicate with the second valve chamber is formed at a position adjacent to the bulging portion, which is an upper part of the second valve chamber forming wall, and
the upper cover is provided with a cover wall extending downward and disposed outside the vent.

4. The valve device for the fuel tank according to claim 3, wherein the second valve chamber forming wall has an outer arcuate wall disposed at a position away from the division wall, an inner arcuate wall formed along a circumscribed circle of the outer arcuate wall is disposed inside the second valve chamber, the second float valve is disposed between the outer arcuate wall and the inner arcuate wall, a main flow path forming wall is provided that projects in an outer diameter direction of the second float valve from an end of the outer arcuate wall in a circumferential direction and that is connected to the division wall, a main flow path is formed between the main flow path forming wall and the inner arcuate wall, an upper space surrounded by the main flow path forming wall, the division wall, and an extension wall extending from the inner arcuate wall toward the main flow path forming wall is formed above the main flow path, and the vent is formed in the main flow path forming wall so as to communicate with the upper space.

5. A valve device for a fuel tank comprising:

a housing provided with a first valve chamber and a second valve chamber which are configured to communicate with an inside of the fuel tank below a partition wall and a ventilation chamber configured to communicate with an outside of the fuel tank above the partition wall, in which the partition wall is provided with a first opening through which the first valve chamber is to communicate with the ventilation chamber and a second opening through which the second valve chamber is to communicate with the ventilation chamber;

a first float valve accommodated in the first valve chamber in a vertically movable manner and configured to block the first opening when a liquid surface in the fuel tank reaches near a set full-tank liquid surface; and a second float valve accommodated in the second valve chamber in a vertically movable manner and configured to block the second opening when the liquid surface in the fuel tank rises to a predetermined height or more, wherein the housing includes a housing body and a lower cap mounted below the housing body, the housing body has a housing body peripheral wall that is open at a bottom, the housing body peripheral wall has a first valve chamber forming wall that forms an outer periphery of the first valve chamber, and a second valve chamber forming wall that has a contour shape different from that of the first valve chamber forming wall as viewed in a valve axis direction and that forms an outer periphery of the second valve chamber, the lower cap has a cap peripheral wall having a shape fitting to the housing body peripheral wall, the housing body includes a division wall configured to divide an inner space of the housing body into the first valve chamber and the second valve chamber, the second valve chamber forming wall has an outer arcuate wall disposed at a position away from the division wall, an inner arcuate wall formed along a circumscribed circle of the outer arcuate wall is disposed inside the second valve chamber, the second float valve is disposed between the outer arcuate wall and the inner arcuate wall, a main flow path forming wall is provided that projects in an outer diameter direction of the second float valve from an end of the outer arcuate wall in a circumferential direction and that is connected to the division wall, a main flow path is formed between the main flow path forming wall and the inner arcuate wall, and a gap communicating with the main flow path is formed between an end of the inner arcuate wall adjacent to the outer arcuate wall and the end of the outer arcuate wall in the circumferential direction.

6. A valve device for a fuel tank comprising:

a housing provided with a first valve chamber and a second valve chamber which are configured to communicate with an inside of the fuel tank below a partition wall and a ventilation chamber configured to communicate with an outside of the fuel tank above the partition wall, in which the partition wall is provided with a first opening through which the first valve chamber is to communicate with the ventilation chamber and a second opening through which the second valve chamber is to communicate with the ventilation chamber;

a first float valve accommodated in the first valve chamber in a vertically movable manner and configured to block the first opening when a liquid surface in the fuel tank reaches near a set full-tank liquid surface; and a second float valve accommodated in the second valve chamber in a vertically movable manner and configured to block the second opening when the liquid surface in the fuel tank rises to a predetermined height or more, wherein the housing includes a housing body and a lower cap mounted below the housing body, the housing body has a housing body peripheral wall that is open at a bottom, the housing body peripheral wall has a first valve chamber forming wall that forms an outer periphery of the first valve chamber, and a second valve chamber forming wall that forms an outer periphery of the second valve chamber, the lower cap has a cap peripheral wall having a shape fitting to the housing body peripheral wall, and a groove is formed in a bottom portion of the lower cap such that a lower end of the first valve chamber forming wall enters the groove but a lower end of the second valve chamber forming wall does not enter the groove, the groove is formed over an entire periphery of a bottom portion of the lower cap on a side of the first valve chamber, the lower end of the first valve chamber forming wall is configured to be press-fitted into the groove, and in a state in which the lower end of the first valve chamber forming wall is press-fitted into the groove, the first valve chamber forming wall that has been bent and deformed elastically returns outward in a radial direction of the first valve chamber, and the lower end of the first valve chamber forming wall is pressed against an inner surface of the groove on an outer diameter side, and an inner peripheral portion of the lower end of the first valve chamber forming wall is brought into contact with an inner surface of the groove on an inner diameter side, thereby suppressing deformation of the lower end.

7. The valve device for the fuel tank according to claim 6, wherein the lower cap includes a division wall configured to divide an inner space of the lower cap into the first valve chamber and the second valve chamber, and the cap peripheral wall on the side of the first valve chamber and the division wall are erected from an edge of the inner surface of the groove on the outer diameter side.

8. The valve device for the fuel tank according to claim 6, wherein a guide wall that is erected from an edge of the inner surface of the groove on the inner diameter side and that extends along the groove is provided at least partially in a circumferential direction of the groove.

9. The valve device for the fuel tank according to claim 6, wherein a guide wall that is erected from an edge of the inner surface of the groove on the inner diameter side and that extends along the groove is provided at least partially in a circumferential direction of the groove, the lower cap has a division wall configured to divide an inner space of the housing body into the first valve chamber and the second valve chamber, and the division wall has a linearly extending portion, and the guide wall includes a portion that is erected from the edge of the inner surface of the groove on the inner diameter side and that extends in parallel with the linearly extending portion of the division wall.

\* \* \* \* \*